(12) United States Patent
Kuroda et al.

(10) Patent No.: US 9,914,349 B2
(45) Date of Patent: Mar. 13, 2018

(54) IN-WHEEL MOTOR DRIVE DEVICE

(71) Applicant: NTN CORPORATION, Osaka (JP)

(72) Inventors: Masaru Kuroda, Shizuoka (JP);
Kenichi Suzuki, Shizuoka (JP);
Naoyuki Uchiyama, Shizuoka (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 15/109,266

(22) PCT Filed: Dec. 19, 2014

(86) PCT No.: PCT/JP2014/083792
§ 371 (c)(1),
(2) Date: Jun. 30, 2016

(87) PCT Pub. No.: WO2015/104980
PCT Pub. Date: Jul. 16, 2015

(65) Prior Publication Data
US 2017/0001513 A1  Jan. 5, 2017

(30) Foreign Application Priority Data

Jan. 8, 2014  (JP) ................................ 2014-001600
Jan. 29, 2014  (JP) ................................ 2014-013954

(51) Int. Cl.
*B60K 17/14*  (2006.01)
*B60K 7/00*  (2006.01)
(Continued)

(52) U.S. Cl.
CPC .......... *B60K 7/0007* (2013.01); *B60K 17/046* (2013.01); *B60K 17/14* (2013.01);
(Continued)

(58) Field of Classification Search
None
See application file for complete search history.

(56) References Cited

U.S. PATENT DOCUMENTS

| 8,506,438 B2* | 8/2013 | Makino ................... B60K 1/00 475/159 |
| 8,721,484 B2* | 5/2014 | Suzuki ..................... F16H 1/32 475/178 |

(Continued)

FOREIGN PATENT DOCUMENTS

| JP | 1-307911 | 12/1989 |
| JP | 2004-270841 | 9/2004 |

(Continued)

OTHER PUBLICATIONS

Selecting Internal Clearance or Preload, pdf of SKF website: http://www.skf.com/us/products/bearings-units-housings/roller-bearings/principles/design-considerations/selecting-clearance-preload/index.html.*

(Continued)

*Primary Examiner* — Dirk Wright
(74) *Attorney, Agent, or Firm* — Wenderoth, Lind & Ponack, L.L.P.

(57) ABSTRACT

Provided is an in-wheel motor drive device, including a casing configured to hold a motor part, a speed reduction part, and a wheel bearing part, the motor part including; a stator, which is fixed to the casing; a rotation shaft of a motor, which is rotatably supported on the casing through intermediation of rolling bearings; and a rotor, which is mounted to the rotation shaft of the motor. The rolling bearing has a radial internal clearance of from 8 μm to 25 μm before being mounted into the motor part. The rotation shaft of the motor is rotatably supported on the casing through intermediation of a plurality of rolling bearings. The rotation shaft of the motor and the rolling bearings configured to support the rotation shaft of the motor are fitted to each other by transition fit or interference fit.

11 Claims, 15 Drawing Sheets

(51) Int. Cl.

| | | |
|---|---|---|
| *H02K 7/116* | (2006.01) | |
| *B60K 17/04* | (2006.01) | |
| *H02K 1/30* | (2006.01) | |
| *H02K 5/173* | (2006.01) | |
| *H02K 7/00* | (2006.01) | |
| *F16C 35/067* | (2006.01) | |
| *F16C 43/04* | (2006.01) | |
| *F16C 25/08* | (2006.01) | |
| *F16C 33/32* | (2006.01) | |
| *F16H 1/32* | (2006.01) | |
| *H02K 7/075* | (2006.01) | |
| *F16C 19/54* | (2006.01) | |
| *F16H 57/04* | (2010.01) | |

(52) U.S. Cl.
CPC ............ *F16C 25/083* (2013.01); *F16C 33/32* (2013.01); *F16C 35/067* (2013.01); *F16C 43/04* (2013.01); *F16H 1/32* (2013.01); *H02K 1/30* (2013.01); *H02K 5/173* (2013.01); *H02K 5/1732* (2013.01); *H02K 7/003* (2013.01); *H02K 7/006* (2013.01); *H02K 7/075* (2013.01); *H02K 7/116* (2013.01); *B60K 2007/0038* (2013.01); *B60K 2007/0092* (2013.01); *F16C 19/543* (2013.01); *F16C 2240/46* (2013.01); *F16C 2380/26* (2013.01); *F16H 57/043* (2013.01); *F16H 57/0471* (2013.01); *F16H 57/0476* (2013.01); *F16H 57/0486* (2013.01); *Y02T 10/641* (2013.01)

(56) References Cited

U.S. PATENT DOCUMENTS

| | | | | |
|---|---|---|---|---|
| 8,840,510 | B2 * | 9/2014 | Nomura | F16H 1/32 184/6.12 |
| 9,022,890 | B2 * | 5/2015 | Smetana | F16D 3/06 475/149 |
| 9,033,840 | B2 * | 5/2015 | Nomura | F16H 1/32 475/150 |
| 9,397,533 | B2 * | 7/2016 | Takuno | H02K 7/116 |
| 2002/0111243 | A1 * | 8/2002 | Minegishi | F16H 1/32 475/178 |
| 2004/0200654 | A1 | 10/2004 | Hatsuda et al. | |
| 2012/0161496 | A1 | 6/2012 | Urabe | |
| 2012/0329597 | A1 * | 12/2012 | Nomura | F16H 1/32 475/150 |
| 2013/0292993 | A1 | 11/2013 | Yukishima et al. | |
| 2014/0128192 | A1 | 5/2014 | Korenaga et al. | |
| 2014/0128194 | A1 * | 5/2014 | Mair | B60K 7/0007 475/149 |
| 2014/0364263 | A1 * | 12/2014 | Tokunaga | F16C 35/063 475/149 |
| 2015/0005130 | A1 | 1/2015 | Yamamoto et al. | |

FOREIGN PATENT DOCUMENTS

| | | | | |
|---|---|---|---|---|
| JP | 2004-328991 | | 11/2004 | |
| JP | 2005-325907 | | 11/2005 | |
| JP | 2008-44538 | | 2/2008 | |
| JP | 2009-257567 | | 11/2009 | |
| JP | 2012-136080 | | 7/2012 | |
| JP | 2012-148725 | | 8/2012 | |
| JP | 2012-202457 | | 10/2012 | |
| JP | 2013-15180 | | 1/2013 | |
| JP | 2013-29195 | | 2/2013 | |
| JP | 2013-148198 | | 8/2013 | |
| JP | 2015116876 A | * | 6/2015 | ............ F16C 19/186 |
| JP | WO 2015093215 A1 | * | 6/2015 | ............ F16C 19/186 |
| JP | WO 2015104980 A1 | * | 7/2015 | ............ B60K 17/14 |

OTHER PUBLICATIONS

International Search Report dated Mar. 31, 2015 in International (PCT) Application No. PCT/JP2014/083792.

International Preliminary Report on Patentability (IPRP) and Written Opinion of the International Searching Authority dated Jul. 12, 2016 in corresponding International Application No. PCT/JP2014/083792.

* cited by examiner

FIG. 7

IN-WHEEL MOTOR DRIVE DEVICE

TECHNICAL FIELD

The present invention relates to an in-wheel motor drive device.

BACKGROUND ART

The related-art in-wheel motor drive device is disclosed in, for example, Patent Document 1 and Patent Document 2. The entire in-wheel motor drive device needs to be lightened and compactified to the extent possible because the entire in-wheel motor drive device needs to be accommodated inside a wheel and the weight and size of the in-wheel motor drive device affect the unsprung weight (driving performance) and the size of a passenger compartment space of a vehicle. Therefore, in the in-wheel motor drive devices of Patent Document 1 and Patent Document 2, at a position between a motor part configured to generate driving force and a wheel bearing part to be connected to a wheel, a speed reduction part configured to reduce a speed of rotation of the motor part to transmit the rotation to the wheel bearing part is provided so as to downsize the motor part and therefore downsize the entire in-wheel motor drive device. The above-mentioned motor part, wheel bearing part, and speed reduction part are held by a casing, and the casing is mounted to a vehicle body through intermediation of a suspension device (suspension) (not shown).

In the above-mentioned in-wheel motor drive device, a low-torque high-rotation (for example, about 15,000 $\text{min}^{-1}$) motor is employed in the motor part so as to obtain a large torque required in the wheel bearing part while promoting light-weighting and compactification. Further, a cycloid reducer capable of obtaining a high speed reduction ratio with a compact size is employed in the speed reduction part.

In the motor part, there is employed a radial gap motor including a stator fixed to the casing, a rotor arranged inside the stator so as to be opposed thereto via a radial gap, and a rotation shaft of the motor, which has the rotor mounted to an outer periphery thereof to rotate integrally with the rotor. The rotation shaft of the motor has hollow structure, and is rotatably supported on the casing by rolling bearings.

The speed reduction part in which the cycloid reducer is utilized mainly includes an input shaft of the speed reducer having a pair of eccentric parts, a pair of curved plates arranged at the eccentric parts, respectively, a plurality of outer periphery engagement members configured to engage with outer peripheral surfaces of the curved plates to cause rotational motion of the curved plates, and a plurality of inner pins configured to transmit the rotational motion of the curved plates to an output shaft of the speed reducer. The above-mentioned rotation shaft of the motor is spline-connected to the input shaft of the speed reducer so that the torque is transmissible therebetween.

PRIOR ART DOCUMENTS

Patent Documents

Patent Document 1: JP 2012-148725 A
Patent Document 2: JP 2013-148198 A

SUMMARY OF THE INVENTION

Problems to be Solved by the Invention

Incidentally, the in-wheel motor drive device is accommodated inside a wheel housing to increase the unsprung weight. Therefore, downsizing and light-weighting are essential to the in-wheel motor drive device. However, the output torque of the motor is proportional to the size of the motor, and hence a large-sized motor is required to generate a torque necessary for driving the vehicle with the motor alone. As a result, the weight is increased. In view of this, a speed reducer is combined with the motor, thereby being capable of downsizing the motor. When the speed reduction ratio is increased to achieve a small-sized motor, the rotation speed needs to be increased inevitably. For example, the use of a speed reducer having a speed reduction ratio of 11 requires a high rotation speed of about 15,000 $\text{min}^{-1}$.

The speed of a vehicle (automobile) having the in-wheel motor drive device mounted thereto is shifted from 0 km/h to a high-speed range of 100 km/h or more. Therefore, vibrations and interior noises within an audible range are caused at a point S at which a resonance frequency R on the periphery of a suspension device and an nth-order forced vibration component cross each other, and at a point S' at which the resonance frequency R and an (n+a)th-order forced vibration component cross each other (see FIG. 15). As a result, passengers may have a feeling of discomfort. Thus, it is important to reduce a rotational first-order forced vibration component, which leads to all kinds of vibrations, in order to improve quietness (NVH characteristics) of the vehicle having the in-wheel motor drive device mounted thereto. However, in the related-art in-wheel motor drive devices, investigations have not thoroughly been conducted for reducing vibrations caused by vibration components including the rotational first-order forced vibration component, and hence the related-art in-wheel motor drive devices have room for improvement.

Further, there is a demand for enhancing the durability of the in-wheel motor drive device to have higher reliability thereof.

In view of the above-mentioned circumstances, the present invention has an object to provide an in-wheel motor drive device that is reduced in size and weight, and is excellent in quietness and durability.

Solutions to the Problems

A first aspect of the present invention is based on the following findings obtained as a result of extensive investigations to achieve the above-mentioned object, which have been conducted focusing particularly on a motor part of the in-wheel motor drive device.

In the in-wheel motor drive device, the rotational first-order forced vibration component corresponds to a vibration to be caused along with rotation of a rotation shaft of a motor having a rotor mounted thereto (hereinafter referred to also as "motor rotor"), and is a vibration component to be generated in each rotation. Therefore, it is conceivably effective to control an operating clearance of a rolling bearing, which is configured to rotatably support the motor rotor, within an appropriate range from the viewpoint of suppressing vibrations to be caused along with the rotation of the motor rotor, and further securing the durability life of the rolling bearing and therefore the durability life of the motor part.

It is advantageous to operate the rolling bearing under a state in which the operating clearance thereof is controlled to become a negative clearance of about several micrometers from the viewpoint of enhancing acoustic performance of the rolling bearing (reducing the amount of abnormal noises and vibrations to be caused), and further securing the durability life of the rolling bearing. However, when the in-wheel motor drive device is driven, the motor rotor is rotated at high speed as described above, and hence the amount of temperature increase of the rolling bearing configured to support the rotation of the motor rotor and the temperature difference between inner and outer rings constructing the rolling bearing become more significant than expected. Thus, it is found that the operating clearance of the rolling bearing is liable to be reduced significantly due to those temperature factors. When the rolling bearing is used continuously under a state in which the operating clearance is reduced significantly so that the negative clearance is increased, the rolling bearing is seized up in an early stage, with the result that the motor part and therefore the in-wheel motor drive device become unusable in an early stage.

In view of the above, the inventors of the present invention have conducted extensive investigations. As a result, the inventors have found that the rolling bearing configured to support the motor rotor is preferably mounted into the motor part so that the operating clearance becomes a positive clearance of about several micrometers from the viewpoint of enhancing the quietness of the rolling bearing and therefore the in-wheel motor drive device (suppressing abnormal noises and vibrations) and prolonging the durability life at the same time. Further, the inventors have found that a radial internal clearance before the rolling bearing is mounted into the motor part only needs to be set to from 8 µm to 25 µm in order to secure the operating clearance within the above-mentioned range.

That is, as a technical measure to achieve the above-mentioned object, according to the first aspect of the present invention, there is provided an in-wheel motor drive device, comprising a casing configured to hold a motor part, a speed reduction part, and a wheel bearing part, the motor part comprising: a stator, which is fixed to the casing; a rotation shaft of a motor, which is rotatably supported on the casing through intermediation of rolling bearings; and a rotor, which is mounted to the rotation shaft of the motor, the speed reduction part comprising: an input shaft of a speed reducer, which is rotationally driven by the rotation shaft of the motor; and an output shaft of the speed reducer, which is configured to transmit rotation of the input shaft of the speed reducer, which is reduced in speed, to the wheel bearing part, each of the rolling bearings having a radial internal clearance of from 8 µm to 25 µm before being mounted.

When the radial internal clearance before the rolling bearing configured to support the rotation shaft of the motor is mounted (into the motor part) is 8 µm or more as described above, the operating clearance of the rolling bearing does not become a negative clearance but constantly becomes a positive clearance even in consideration of the amount of temperature increase during operation (amount of thermal expansion of each member during operation). Thus, a desired durability life can be secured. When the radial internal clearance before the rolling bearing is mounted is 25 µm or less, the operating clearance is prevented from becoming excessively larger. Thus, the operating clearance can be maintained within an appropriate range. Accordingly, it is possible to effectively suppress the generation of the rotational first-order forced vibration component along with whirling of the motor rotor, and also to reduce the axial movement amount of the motor rotor, thereby being capable of preventing the occurrence of abnormal noises and vibrations along with the axial movement of the motor rotor to the extent possible. Thus, according to the first aspect of the present invention, the in-wheel motor drive device that is excellent in durability and quietness can be achieved by, for example, securing the durability of the rolling bearing configured to support the rotation shaft of the motor and preventing the whirling of the rotation shaft of the motor.

The each of the above-mentioned rolling bearings has an axial preload applied thereto. Accordingly, the operating clearance becomes easier to maintain within an appropriate range depending on the preload amount, thereby being capable of more effectively suppressing the occurrence of vibrations due to the whirling of the rotation shaft of the motor (motor rotor) or other phenomena. Further, the rotation shaft of the motor is configured to rotationally drive the input shaft of the speed reducer (the rotation shaft of the motor is connected to the input shaft of the speed reducer by, for example, spline fitting so that the torque is transmissible therebetween). Therefore, when the rotation shaft of the motor is vibrated along with the rotation of the rotation shaft of the motor, vibrations are also caused along with sliding contact between tooth flanks at the connecting portion (spline fitting portion) between the rotation shaft of the motor and the input shaft of the speed reducer. When the axial preload is applied to the rolling bearing, the occurrence of vibrations at the connecting portion between the above-mentioned two shafts can be prevented to the extent possible.

The axial preload is applied by an elastic member, which is elastically deformable in an axial direction thereof. Accordingly, the above-mentioned axial preload can be applied as a so-called constant pressure preload. The preload amount of the constant pressure preload does not fluctuate even when, for example, different materials are used for the rotation shaft of the motor and a member configured to hold the rolling bearing and therefore the amounts of thermal expansion of the two components are different from each other. Therefore, the operating clearance of the rolling bearing can securely be maintained within an appropriate range, and hence the constant pressure preload is suitable in this case. Examples of the elastic member that may be employed include a coil spring, a wave spring, and a flat spring.

It is preferred that ceramic balls be employed as rolling elements constructing the each of the above-mentioned rolling bearings. The reason is as follows. The ceramic ball is lighter than a metal ball, thereby being advantageous in that increase in friction moment (heat generation amount) along with high-speed rotation can be suppressed effectively, and that the rolling bearing and therefore the in-wheel motor drive device are lightened. Further, the employment of the ceramic balls as the rolling elements enhances the durability against a failure mode due to a magnetic field, which is a problem in a rolling bearing to be used in electric devices such as the in-wheel motor drive device.

It is preferred that a resin cage be employed as a cage constructing the each of the above-mentioned rolling bearings. Accordingly, the rolling bearing and therefore the in-wheel motor drive device can further be lightened.

A lubrication mechanism configured to supply lubricating oil to the motor part is provided, thereby being capable of appropriately lubricating and cooling respective portions of the motor part including the above-mentioned rolling bearings.

In the above-mentioned configuration described above, as the speed reduction part, there may be employed a speed reduction part comprising: the input shaft of the speed reducer; a revolving member, which is rotatably held at an eccentric portion of the input shaft of the speed reducer, and is configured to perform revolving motion about a rotation axis center of the input shaft of the speed reducer along with the rotation of the input shaft of the speed reducer; an outer periphery engagement member, which is engaged with an outer peripheral portion of the revolving member to cause rotational motion of the revolving member; and a motion conversion mechanism, which is configured to convert the rotational motion of the revolving member into rotary motion about the rotation axis center of the input shaft of the speed reducer to transmit the rotary motion to the output shaft of the speed reducer.

A second aspect of the present invention is based on the following findings obtained through investigations, which have been conducted from various viewpoints for the rotation shaft of the motor having the rotor mounted thereto in the in-wheel motor drive device.

(1) Vibration Analysis

The rotational first-order forced vibration component of the rotation shaft of the motor having the rotor mounted thereto (hereinafter referred to also as "motor rotor") corresponds to a vibration to be caused along with the rotation of the motor rotor, and is a vibration component to be generated in each rotation. This vibration is caused by centrifugal force determined based on the amount of unbalance and the number of rotations of the motor rotor under a state in which a center of profile and a center of inertia of the motor rotor coincide with each other. Minimization of the amount of unbalance is an effective method for suppressing vibrations.

Even in a motor rotor in which the center of profile and the center of inertia of the motor rotor coincide with each other and the amount of unbalance is also minimized, a clearance between the rotation shaft of the motor and the rolling bearing configured to support the rotation shaft of the motor is a factor in vibrations due to the whirling of the motor rotor. When the weight of the motor rotor is large, the whirling affects vibrations more significantly.

Particularly in the in-wheel motor drive device being an unsprung weight, when the weight of the motor rotor is large, a fitting clearance between the rotation shaft of the motor and the rolling bearing affects vibrations significantly. Therefore, it is found that the in-wheel motor drive device is sensitive to vibrations and unexpectedly difficult to damp the vibrations. Further, it is found that the suppression of the whirling may greatly contribute to the quietness of a vehicle having the in-wheel motor drive device mounted thereto.

(2) Fitting between Rotation Shaft of Motor and Rolling Bearing

To suppress the whirling, the inventors of the present invention have focused on eliminating the fitting clearance between the rotation shaft of the motor and the rolling bearing, and have found that transition fit or interference fit is effective in fitting the rotation shaft of the motor and the rolling bearing to each other. In the interference fit, the shaft diameter of the rotation shaft of the motor is constantly larger than the inner diameter of the rolling bearing. In the clearance fit, conversely, the shaft diameter of the rotation shaft of the motor is constantly smaller than the inner diameter of the rolling bearing. The transition fit refers to fitting that may be a compromise between the clearance fit and the interference fit. In the transition fit, an interference of from 21 μm to 2 μm is set as a tolerance of a shaft with respect to a radial bearing. In the interference fit, an interference of from 45 μm to 22 μm is set as the tolerance of the shaft with respect to the radial bearing. In the clearance fit, a clearance of from 0 μm to 43 μm is set as the tolerance of the shaft with respect to the radial bearing.

(3) Fitting between Casing and Rolling Bearing

Even when the fitting clearance between the rotation shaft of the motor and the rolling bearing is eliminated but a clearance is formed between the rolling bearing and the casing, the rotation shaft of the motor is still whirled. Considering the assembling of the bearing, interference fit of both the inner ring and the outer ring of the bearing may lead to damage to raceway surfaces due to the rolling elements of the bearing at the time of assembling, thereby being inappropriate for the bearing life and vibrations. Therefore, when the rotation shaft of the motor and the inner ring of the bearing are fitted to each other by transition fit or interference fit, it is preferred that the outer ring of the bearing and the casing be fitted to each other by clearance fit. In this case, it is found necessary to take measures for suppressing the whirling.

(4) Bearing Internal Clearance

The rolling bearing has a bearing internal clearance. The bearing internal clearance is generally reduced due to the temperature difference between the inner and outer rings. From the viewpoint of the bearing life, the bearing internal clearance is selected so that an operating clearance becomes slightly larger than 0 μm. However, the bearing internal clearance is a factor in the whirling of the motor rotor. In the in-wheel motor drive device being the unsprung weight, it is found that the whirling also affects vibrations significantly.

(5) Spline Fitting Portion between Rotation Shaft of Motor and Input Shaft of Speed Reducer The rotation shaft of the motor is connected to the input shaft of the speed reducer by spline fitting so that the torque is transmissible therebetween. It is found effective to suppress misalignment to be caused between the rotation shaft of the motor and the input shaft of the speed reducer or motion such as vibrations to be caused by rattling of the meshing.

As a technical measure to achieve the above-mentioned object, according to the second aspect of the present invention, there is provided an in-wheel motor drive device, comprising: a motor part; a speed reduction part; a wheel bearing part; and a casing, the motor part comprising: a stator, which is fixed to the casing; a rotation shaft of a motor, which is rotatably supported on the casing through intermediation of a plurality of rolling bearings; and a rotor, which is mounted to the rotation shaft of the motor, the rotation shaft of the motor in the motor part being configured to rotationally drive an input shaft of a speed reducer in the speed reduction part, the speed reduction part being configured to reduce a speed of rotation of the input shaft of the speed reducer to transmit the rotation to an output shaft of the speed reducer, the wheel bearing part being connected to the output shaft of the speed reducer, the rotation shaft of the motor being rotatably supported on the casing through intermediation of the plurality of rolling bearings, the rotation shaft of the motor and the plurality of rolling bearings configured to support the rotation shaft of the motor being fitted to each other by transition fit or interference fit. With this configuration, it is possible to achieve an in-wheel motor drive device that is capable of reducing the rotational first-order forced vibration component to such a level that a low-torque high-rotation motor may be employed, reduced in size and weight, excellent in quietness, and is enhanced in durability.

It is preferred that the above-mentioned plurality of rolling bearings and the casing be fitted to each other by clearance fit. Accordingly, the rolling elements of the rolling bearings do not damage the raceway surfaces at the time of assembling, thereby being capable of avoiding reduction of the bearing life.

It is preferred that each of the above-mentioned plurality of rolling bearings have an axial constant pressure preload applied thereto. Accordingly, the bearing internal clearance is eliminated, thereby being capable of reducing the factor in the whirling of the rotation shaft of the motor. The constant pressure preload is not susceptible to fluctuation of axial displacement to be caused by a difference in thermal expansion, thereby being capable of suppressing fluctuation of the preload. Thus, the constant pressure preload is suitable for the in-wheel motor drive device.

It is preferred that the above-mentioned rotation shaft of the motor be supported on both sides thereof through intermediation of a pair of rolling bearings, and that any one of the pair of rolling bearings be fixed by bringing a side surface of a holding member, which is fixed to the casing, into abutment against an end surface of an outer ring of the any one of the pair of rolling bearings. The rolling bearing and the casing are fitted to each other by clearance fit, but the end surface of the outer ring of the bearing is pressed, thereby being capable of suppressing the misalignment to be caused between the rotation shaft of the motor and the input shaft of the speed reducer or the motion such as vibrations to be caused by the rattling of the meshing at the spline fitting portion.

The any one of the pair of rolling bearings, which is fixed by the above-mentioned holding member, corresponds to a bearing configured to support an end of the rotation shaft of the motor on the speed reduction part side, thereby being capable of effectively suppressing the misalignment to be caused between the rotation shaft of the motor and the input shaft of the speed reducer or the motion such as vibrations to be caused by the rattling of the meshing at the spline fitting portion.

The above-mentioned holding member is formed of a hollow disc. Accordingly, the holding member is capable of easily varying the pressing force by changing the thickness of the disc, and is also easily adaptable to variation of the shape of the pressing portion.

The above-mentioned holding member is formed of a base portion, which is a hollow disc, and a plurality of abutment portions, which project in a radially inward direction from the base portion. Accordingly, in addition to the advantage of the above-mentioned disc, the adaptability of the plurality of projecting portions to the end surface of the outer ring is excellent so that stable pressing force is applied.

It is preferred that the thickness of the above-mentioned holding member be set to from 0.5 mm to 5 mm. The thickness of less than 0.5 mm is inappropriate because the pressing force is so small that the bearing holding force becomes smaller. The thickness of more than 5 mm is not preferred because reduction in axial length, which is a structural requirement for the in-wheel motor drive device, cannot be achieved.

Effects Of The Invention

As described above, according to the first aspect of the present invention and the second aspect of the present invention, the in-wheel motor drive device that is reduced in weight and size, and is also excellent in quietness and durability can be achieved.

BRIEF DESCRIPTION OF DRAWINGS

FIG. 7 is a view for illustrating an in-wheel motor drive device according to an embodiment of a second aspect of the present invention.

EMBODIMENTS OF THE INVENTION

Figure 16:
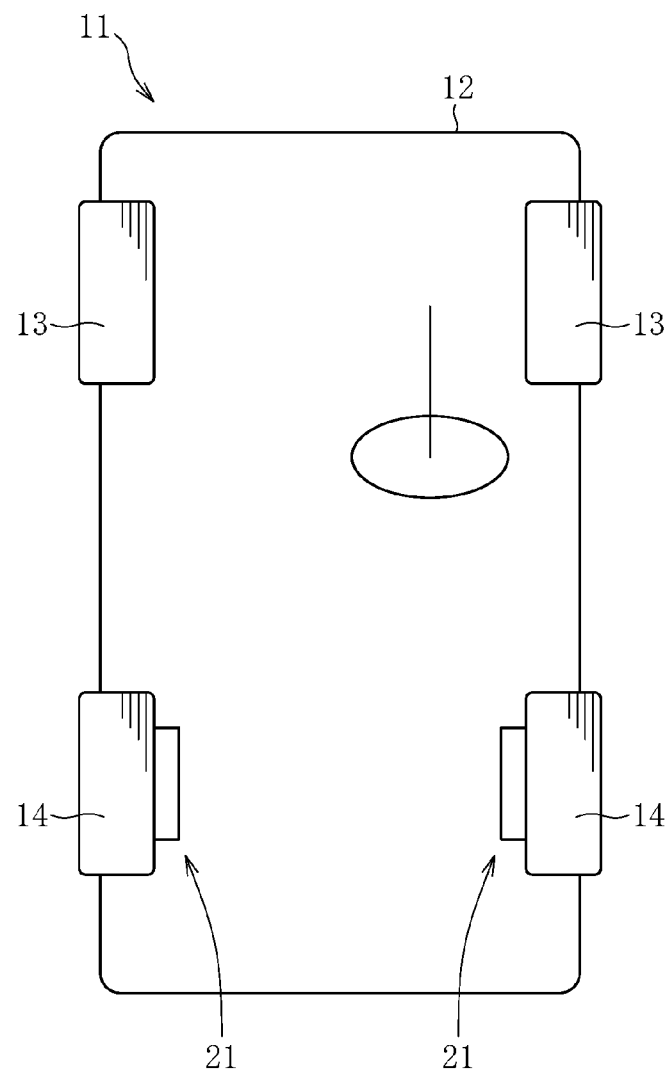
FIG. 16 is a schematic plan view for illustrating an electric vehicle.
Figure 17:
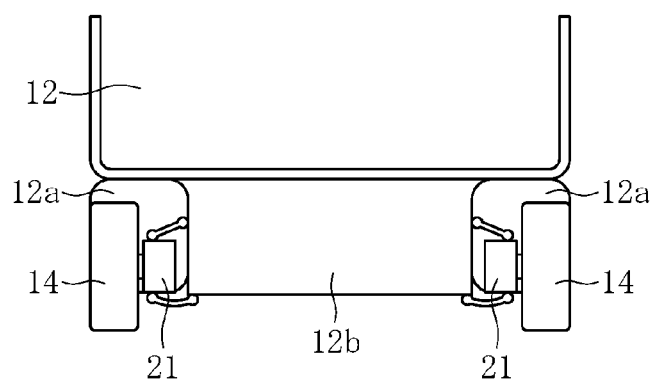
FIG. 17 is a schematic sectional view for illustrating the electric vehicle of FIG. 16 when viewed from the rear.

An overview of an electric vehicle 11 having in-wheel motor drive devices mounted thereto is described with reference to FIG. 16 and FIG. 17. As illustrated in FIG. 16, the electric vehicle 11 comprises a chassis 12, a pair of front wheels 13 functioning as steered wheels, a pair of rear wheels 14 functioning as driving wheels, and in-wheel motor drive devices 21 configured to drive right and left rear wheels 14, respectively. As illustrated in FIG. 17, each rear wheel 14 is accommodated inside a wheel housing 12a of the chassis 12 and fixed below the chassis 12 through intermediation of a suspension device (suspension) 12b.

In the suspension device 12b, a horizontally extending suspension arm supports the rear wheels 14, and a strut comprising a coil spring and a shock absorber absorbs vibrations that each rear wheel 14 receives from the road surface to suppress vibrations of the chassis 12. In addition, a stabilizer configured to suppress tilting of a vehicle body during turning and other operations is provided at connecting portions of the right and left suspension arms. In order to enhance the property of following irregularities of the road surface to transmit the driving force of the rear wheels 14 to the road surface efficiently, the suspension device 12b is desirably an independent suspension type capable of independently moving the right and left wheels up and down.

The electric vehicle 11 need not comprise a motor, a drive shaft, a differential gear mechanism, and other components on the chassis 12 because the in-wheel motor drive devices 21 configured to rotationally drive the right and left rear wheels 14, respectively, are mounted into the right and left wheel housings 12a. Therefore, the electric vehicle 11 has the advantages in that a large passenger compartment space can be provided and rotation of the right and left rear wheels 14 can be controlled, respectively.

Figure 1:
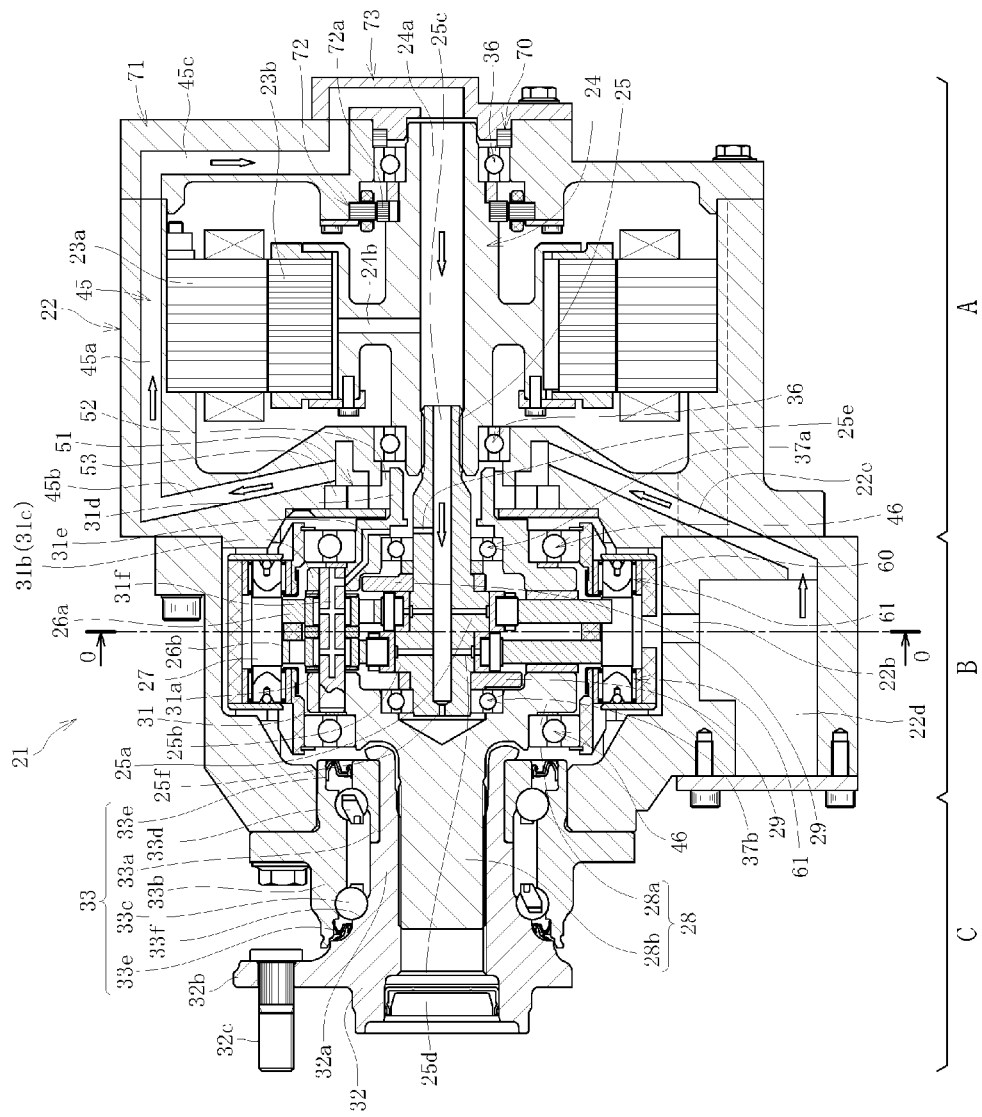
FIG. 1 is a view for illustrating an in-wheel motor drive device according to an embodiment of a first aspect of the present invention.
Figure 7:
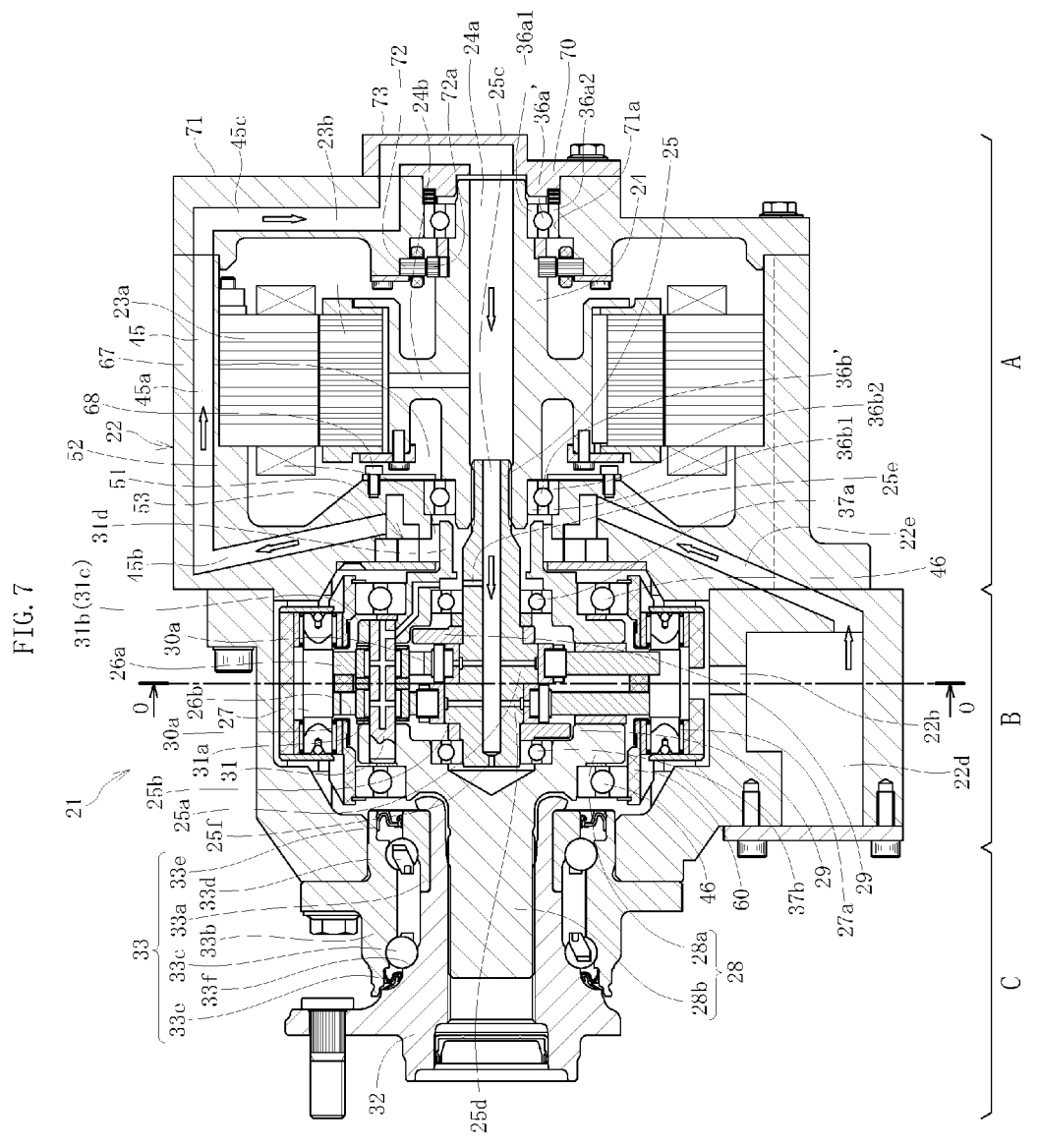

It is necessary to reduce the unsprung weight in order to enhance the driving stability and the NVH characteristics of the electric vehicle 11. In addition, the in-wheel motor drive device 21 is required to be downsized to provide a larger passenger compartment space in the electric vehicle 11. Therefore, in-wheel motor drive devices 21 according to embodiments of a first aspect of the present invention and a second aspect of the present invention are employed as illustrated in FIG. 1 and FIG. 7.

The in-wheel motor drive device 21 according to an embodiment of the first aspect of the present invention is described with reference to FIG. 1 to FIG. 6. Prior to the description of a characteristic configuration of the in-wheel motor drive device according to this embodiment, an overall configuration of the in-wheel motor drive device is described. As illustrated in FIG. 1, the in-wheel motor drive device 21 comprises a motor part A configured to generate driving force, a speed reduction part B configured to reduce a speed of rotation of the motor part A to output the rotation, and a wheel bearing part C configured to transmit the output from the speed reduction part B to the rear wheel 14. The motor part A, the speed reduction part B, and the wheel bearing part C are held in a casing 22. As described later in detail, the in-wheel motor drive device 21 comprises a lubrication mechanism configured to supply lubricating oil to respective portions of the motor part A and the speed reduction part B. The motor part A and the speed reduction part B are mounted inside the wheel housing 12a (see FIG. 17) of the electric vehicle 11 under a state in which the motor part A and the speed reduction part B are accommodated in the casing 22. The casing 22 of this embodiment is constructed by fastening a portion accommodating the motor part A and a portion accommodating the speed reduction part B with bolts, and both the portions are divisible (separable) from each other when the bolts are removed. In this description and the claims, the casing 22 refers to both of the casing portion accommodating the motor part A and the casing portion accommodating the speed reduction part B.

The motor part A is a radial gap motor comprising a stator 23a fixed to the casing 22, a rotor 23b arranged inside the stator 23a so as to be opposed thereto via a radial gap, and a rotation shaft 24 of the motor, which has hollow structure and has the rotor 23b mounted to an outer periphery thereof.

The rotation shaft 24 of the motor is rotatably supported on the casing 22 by rolling bearings 36 and 36 respectively arranged at one end in the axial direction (right side in FIG. 1; hereinafter referred to also as "inboard side") and at the other end in the axial direction (left side in FIG. 1; hereinafter referred to also as "outboard side"). The rolling bearing 36 is a so-called deep groove ball bearing comprising, as in the schematic structure illustrated in FIG. 5, an outer ring 36a fitted and fixed to a radially inner surface of the casing 22 (in the case of the rolling bearing 36 on the inboard side, a cover 71 in a strict sense), an inner ring 36b fitted and fixed to a radially outer surface of the rotation shaft 24 of the motor, a plurality of balls 36c arranged between the outer ring 36a and the inner ring 36b, and a cage (not shown) configured to retain the plurality of balls 36c in a state of being spaced away from each other in a circumferential direction.

The rotation shaft 24 of the motor is made of case hardening steel such as SCM415 or SCM420, and has a hardened layer formed by carburizing, quenching, and tempering. Although detailed illustration is omitted, the hardened layer is formed at least at portions of the rotation shaft 24 of the motor, to which the rotor 23b and the inner ring 36b of the rolling bearing 36 are fitted and fixed. Thus, deformation, abrasion, damage, or other trouble of the rotation shaft 24 of the motor, which may be caused along with the assembling of the rotor 23b and the rolling bearing 36, is prevented to the extent possible. The portions of the rotation shaft 24 of the motor, at which the hardened layer is formed, have a hardness of from about 62 HRC to about 66.5 HRC, and the core has a hardness of from about 29 HRC to about 38 HRC. As described above, the core of the rotation shaft 24 of the motor has toughness, thereby being durable against deformation during high-speed rotation.

The speed reduction part B comprises an input shaft 25 of a speed reducer, which is rotationally driven by the rotation shaft 24 of the motor, and an output shaft 28 of the speed reducer, which is configured to reduce a speed of rotation of the input shaft 25 of the speed reducer to transmit the rotation to the wheel bearing part C. The input shaft 25 of the speed reducer is rotatably supported on the output shaft 28 of the speed reducer by rolling bearings 37a and 37b at a substantially central portion in the axial direction and at an end on the outboard side, respectively. The input shaft 25 of the speed reducer has eccentric portions 25a and 25b. The two eccentric portions 25a and 25b are arranged with a 180° phase shift to mutually cancel out centrifugal force caused by eccentric motion.

The rotation shaft 24 of the motor and the input shaft 25 of the speed reducer are connected to each other by spline (including serration; the same applies hereinafter) fitting, and the driving force of the motor part A is transmitted to the speed reduction part B. The connecting portion (spline fitting portion) between the rotation shaft 24 of the motor and the input shaft 25 of the speed reducer is configured to suppress influences on the rotation shaft 24 of the motor even when the input shaft 25 of the speed reducer is inclined to some extent.

The speed reduction part B further comprises curved plates 26a and 26b serving as revolving members rotatably held at the eccentric portions 25a and 25b of the input shaft 25 of the speed reducer, respectively, a plurality of outer pins 27 serving as outer periphery engagement members held at fixed positions on the casing 22 and configured to engage with outer peripheral portions of the curved plates 26a and 26b, a motion conversion mechanism configured to convert rotational motion of each of the curved plates 26a and 26b into rotary motion of the output shaft 28 of the speed reducer, and counterweights 29 and 29 arranged adjacently on an outer side of the eccentric portions 25a and 25b in the axial direction.

The output shaft 28 of the speed reducer has a flange portion 28a and a shaft portion 28b. At the end surface of the flange portion 28a, holes for fixing inner pins 31 are formed at equal intervals on the circumference about the rotation axis center of the output shaft 28 of the speed reducer. The shaft portion 28b is connected to a hub wheel 32 in the wheel bearing part C by spline fitting, to thereby transmit the output from the speed reduction part B to the rear wheel 14 (see FIG. 16 and FIG. 17).

Figure 2:
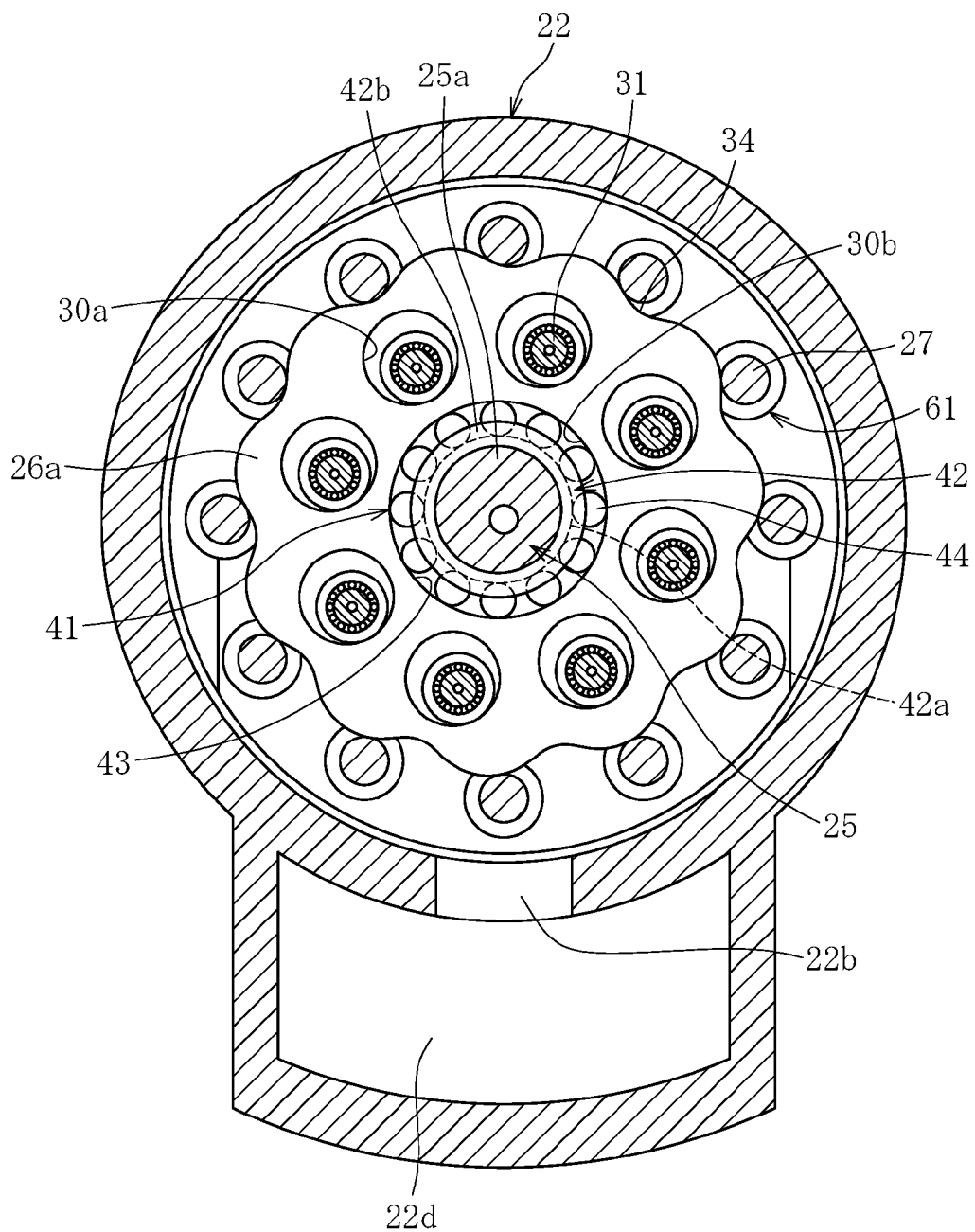
FIG. 2 is a sectional view taken along the line O-O of FIG. 1 and viewed in the arrow direction.

As illustrated in FIG. 2, the curved plate 26a has a plurality of wave patterns formed of trochoidal curves, such as epitrochoidal curves, in the outer periphery portion thereof. The curved plate 26a further has axial through-holes 30a and 30b opened to both end surfaces of the curved plate 26a. A plurality of the through-holes 30a are formed at equal intervals on the circumference about the rotation axis center of the curved plate 26a and are configured to receive the inner pins 31 to be described later, respectively. The through-hole 30b is formed at the center of the curved plate 26a, and the eccentric portion 25a of the input shaft 25 of the speed reducer is fitted thereinto.

The curved plate 26a is rotatably supported by a rolling bearing 41 with respect to the eccentric portion 25a. The rolling bearing 41 is a cylindrical roller bearing comprising an inner ring 42 having an inner raceway surface 42a on the radially outer surface thereof and being fitted onto the radially outer surface of the eccentric portion 25a, an outer raceway surface 43 directly formed on the radially inner surface of the through-hole 30b of the curved plate 26a, a plurality of cylindrical rollers 44 arranged between the inner raceway surface 42a and the outer raceway surface 43, and a cage (not shown) configured to retain the cylindrical rollers 44. The inner ring 42 has a flange portion 42b projecting in a radially outward direction from both ends of the inner raceway surface 42a in the axial direction. In the rolling bearing 41 of this embodiment, the inner raceway surface 42a is formed on the inner ring 42 provided separately from the eccentric portion 25a, but the inner raceway surface may directly be formed on the radially outer surface of the eccentric portion 25a to omit the inner ring 42. Although detailed illustration and description are omitted, the curved plate 26b has the same structure as the curved plate 26a, and is rotatably supported on the eccentric portion 25b by a rolling bearing having the same structure as the rolling bearing 41 configured to support the curved plate 26a.

As illustrated in FIG. 2, the outer pins 27 are provided at equal intervals on the circumference about the rotation axis center of the input shaft 25 of the speed reducer. As a result of revolving motion of the curved plates 26a and 26b, curved wave patterns formed on the outer peripheral portions of the curved plates 26a and 26b are engaged with the outer pins 27 in the circumferential direction to cause rotational motion of the curved plates 26a and 26b. As illustrated in FIG. 1, each outer pin 27 is rotatably supported on the casing 22 through intermediation of rolling bearings (needle roller bearings) 61 arranged at ends of the outer pin 27 on the inboard side and the outboard side, and an outer pin housing 60 that holds the needle roller bearings 61 on an inner periphery thereof. With this configuration, the resistance of contact between the outer pins 27 and the curved plates 26a and 26b can be reduced.

Although detailed illustration is omitted, the outer pin housing 60 is supported on the casing 22 in a floating state by a rotation stopper (not shown) having an elastic support function. This configuration is provided for the purpose of absorbing significant radial and moment loads, which may be generated due to, for example, turning or abrupt acceleration and deceleration of the vehicle, to thereby prevent damage to components (such as the curved plates 26a and 26b and the outer pins 27) of the motion conversion mechanism configured to convert the rotational motion of each of the curved plates 26a and 26b into the rotary motion of the output shaft 28 of the speed reducer.

The counterweight 29 has an approximately fan shape, has a through-hole into which the input shaft 25 of the speed reducer is fitted, and is arranged at a position adjacent to each of the eccentric portions 25a and 25b in the axial direction with a 180° phase shift with respect to the eccentric portions 25a and 25b in order to cancel out unbalanced inertia couple caused by the rotation of the curved plates 26a and 26b.

As illustrated in FIG. 1, the motion conversion mechanism comprises the plurality of inner pins 31 held on the output shaft 28 of the speed reducer and the through-holes 30a formed in the curved plates 26a and 26b. As illustrated in FIG. 2, the inner pins 31 are provided at equal intervals on the circumference about the rotation axis center of the output shaft 28 of the speed reducer, and each have an end on the outboard side fixed to the output shaft 28 of the speed reducer. The output shaft 28 of the speed reducer and the input shaft 25 of the speed reducer are coaxially arranged, and hence the rotational motion of each of the curved plates 26a and 26b is converted into rotary motion about the rotation axis center of the input shaft 25 of the speed reducer and transmitted to the output shaft 28 of the speed reducer. In order to reduce the resistance of friction between the inner pins 31 and the curved plates 26a and 26b, a needle roller bearing 31a is provided on inner peripheries of the through-holes 30a in the curved plates 26a and 26b.

A stabilizer 31b is provided in the speed reduction part B. The stabilizer 31b comprises an annular portion 31c having a circular ring shape and a cylindrical portion 31d extending axially from the radially inner surface of the annular portion 31c. An end of each of the inner pins 31 on the inboard side is fixed to the annular portion 31c. With this, the load applied to some of the inner pins 31 from the curved plates 26a and 26b is supported by all the inner pins 31 through the stabilizer 31b. Therefore, the stress acting on the inner pins 31 can be reduced to enhance the durability.

As illustrated in FIG. 2, the through-holes 30a are formed at positions corresponding to the plurality of inner pins 31, and the inner diameter dimension of each through-hole 30a is set to be larger by a predetermined dimension than the outer diameter dimension (corresponding to "maximum outer diameter including the needle roller bearing 31a"; the same applies hereinafter) of each inner pin 31.

Now, the state of the load acting on each of the curved plates 26a and 26b when the motor part A is driven is described with reference to FIG. 3.

An axis center $O_2$ of the eccentric portion 25a formed on the input shaft 25 of the speed reducer is eccentric with respect to an axis center O of the input shaft 25 of the speed reducer by an amount of eccentricity e. The curved plate 26a is mounted to the outer periphery of the eccentric portion 25a, and the eccentric portion 25a rotatably supports the curved plate 26a. Accordingly, the axis center $O_2$ is also an axis center of the curved plate 26a. The outer peripheral portion of the curved plate 26a is formed of a wavy curve, and the curved plate 26a has radially concave recesses 34 equiangularly. On the periphery of the curved plate 26a, the plurality of outer pins 27 configured to engage with the recesses 34 are arranged in the circumferential direction about the axis center O.

Figure 3:
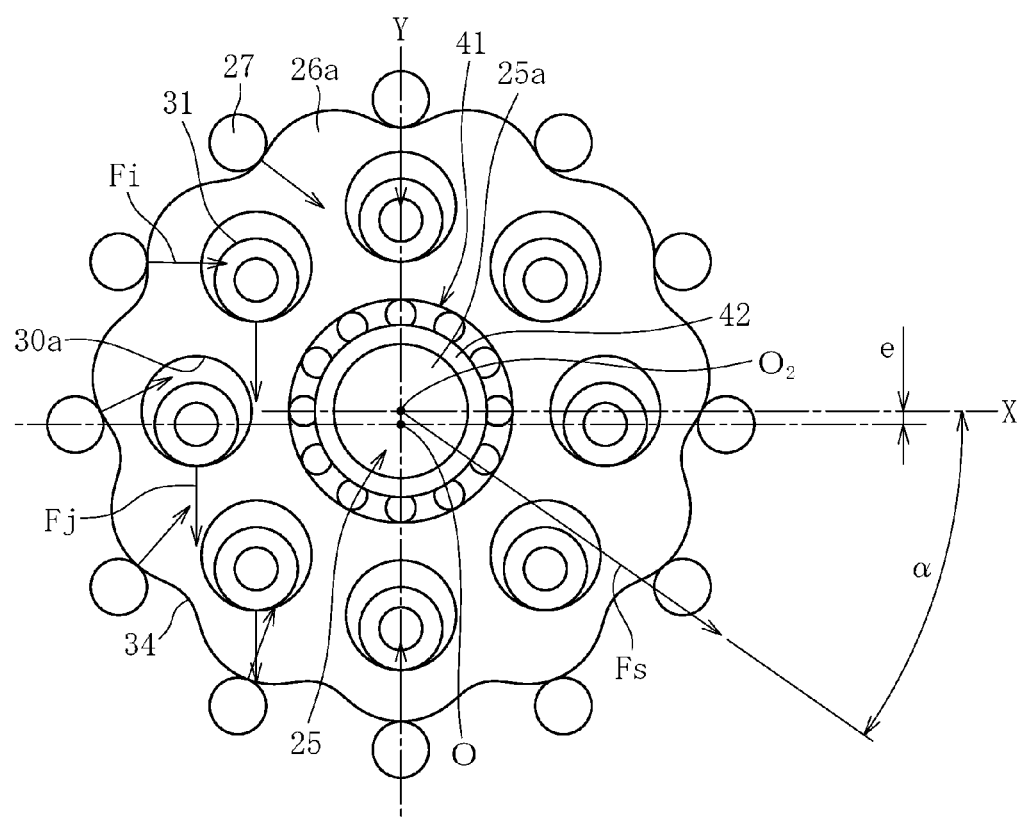
FIG. 3 is an explanatory view for illustrating a load acting on a curved plate of FIG. 1.

In FIG. 3, when the input shaft 25 of the speed reducer rotates in a counterclockwise direction on the drawing sheet, the eccentric portion 25a revolves about the axis center O. Therefore, the recesses 34 of the curved plate 26a successively come into circumferential contact with the outer pins 27. As a result, the curved plate 26a is subjected to a load Fi as indicated by the arrows in FIG. 3 from each of the plurality of outer pins 27 to rotate in a clockwise direction.

The curved plate 26a has the plurality of through-holes 30a formed in the circumferential direction about the axis center $O_2$. The inner pin 31 configured to be joined to the output shaft 28 of the speed reducer, which is arranged coaxially with the axis center O, is inserted through each through-hole 30a. The inner diameter of each through-hole 30a is larger by a predetermined dimension than the outer diameter of each inner pin 31, and hence the inner pins 31 do not impede the revolving motion of the curved plate 26a, and the inner pins 31 utilize the rotational motion of the curved plate 26a to rotate the output shaft 28 of the speed reducer. Then, the output shaft 28 of the speed reducer has a higher torque and a lower number of rotations than the input shaft 25 of the speed reducer, and the curved plate 26a is subjected to a load Fj as indicated by the arrows in FIG. 3 from each of the plurality of inner pins 31. A resultant force Fs of the plurality of loads Fi and Fj is applied to the input shaft 25 of the speed reducer.

The direction of the resultant force Fs varies depending on the geometric conditions such as the wavy shape of the curved plate 26a and the number of the recesses 34, and on the effect of centrifugal force. Specifically, an angle a formed between the resultant force Fs and a reference line X that is orthogonal to a straight line Y connecting the rotation axis center $O_2$ and the axis center O and passes through the axis center $O_2$ varies within a range of from approximately 30° to approximately 60°. The above-mentioned plurality of loads Fi and Fj vary in load direction and load magnitude during one rotation of the input shaft 25 of the speed reducer. As a result, the resultant force Fs acting on the input shaft 25 of the speed reducer also varies in load direction and load magnitude. One rotation of the input shaft 25 of the speed reducer causes speed reduction of the recesses 34 of the curved plate 26a to rotate the curved plate 26a by one pitch in the clockwise direction to be brought into the state of FIG. 3. This process is repeated.

As illustrated in FIG. 1, the wheel bearing part C comprises the hub wheel 32 connected to the output shaft 28 of the speed reducer and a wheel bearing 33 configured to rotatably support the hub wheel 32 with respect to the casing 22. The hub wheel 32 has a hollow portion 32a having a cylindrical shape and a flange portion 32b. The rear wheels 14 (see FIG. 16 and FIG. 17) are connected and fixed to the flange portion 32b through bolts 32c. The shaft portion 28b of the output shaft 28 of the speed reducer is connected to the hollow portion 32a of the hub wheel 32 by spline fitting, to thereby transmit the output from the output shaft 28 of the speed reducer to the hub wheel 32.

The wheel bearing 33 is a double-row angular contact ball bearing comprising an inner member having an inner raceway surface 33f directly formed on the radially outer surface of the hub wheel 32 and an inner ring 33a fitted onto a small-diameter step portion of the radially outer surface, an outer ring 33b fitted and fixed to the radially inner surface of the casing 22, a plurality of rolling elements (balls) 33c arranged between the inner member and the outer ring 33b, a cage 33d configured to retain the balls 33c in a state of being circumferentially away from each other in the circumferential direction, and a sealing member 33e configured to seal both ends of the wheel bearing 33 in the axial direction.

Next, the lubrication mechanism is described. The lubrication mechanism is configured to supply the lubricating oil to the respective portions of the motor part A and the speed reduction part B. As illustrated in FIG. 1, the lubrication mechanism mainly comprises a lubricating oil path 24a and a lubricating oil supply port 24b formed in the rotation shaft 24 of the motor, a lubricating oil path 25c and lubricating oil supply ports 25d, 25e, and 25f formed in the input shaft 25 of the speed reducer, a lubricating oil path 31e formed in the stabilizer 31b, lubricating oil paths 31f formed in the inner pins 31, a lubricating oil discharge port 22b, a lubricating oil reservoir 22d, a lubricating oil path 22e, and a circulation oil path 45 (45a to 45c) formed in the casing 22, and a rotary pump 51. The outline arrows illustrated in FIG. 1 indicate directions of lubricating oil flow.

The lubricating oil path 24a extends along the axial direction inside the rotation shaft 24 of the motor, and the lubricating oil path 25c extending along the axial direction inside the input shaft 25 of the speed reducer is connected to the lubricating oil path 24a. The lubricating oil supply ports 25d and 25e extend in the radial direction from the lubricating oil path 25c toward the radially outer surface of the input shaft 25 of the speed reducer, and the lubricating oil supply port 25f extends in the axial direction from the lubricating oil path 25c toward an outer end surface of the input shaft 25 of the speed reducer.

The lubricating oil discharge port 22b formed in the casing 22 is configured to discharge the lubricating oil inside the speed reduction part B. The lubricating oil discharge port 22b is formed at least at one location of the casing 22 at the position of the speed reduction part B. The lubricating oil discharge port 22b is connected to the lubricating oil path 24a of the rotation shaft 24 of the motor through the lubricating oil reservoir 22d, the lubricating oil path 22e, and the circulation oil path 45. Therefore, the lubricating oil discharged through the lubricating oil discharge port 22b flows through the lubricating oil path 22e, the circulation oil path 45, and other paths to return to the lubricating oil path 24a of the rotation shaft 24 of the motor. The lubricating oil reservoir 22d formed between the lubricating oil discharge port 22b and the lubricating oil path 22e has a function of temporarily storing the lubricating oil.

As illustrated in FIG. 1, the circulation oil path 45 formed in the casing 22 comprises an axial oil path 45a axially extending inside the casing 22, a radial oil path 45c being connected to an end of the axial oil path 45a on the inboard side and extending in the radial direction, and a radial oil path 45b being connected to an end of the axial oil path 45a on the outboard side and extending in the radial direction. The radial oil path 45b supplies the lubricating oil force-fed through the rotary pump 51 to the axial oil path 45a. The lubricating oil supplied to the axial oil path 45a is supplied to the lubricating oil path 24a of the rotation shaft 24 of the motor and further to the lubricating oil path 25c of the input shaft 25 of the speed reducer through the radial oil path 45c.

The rotary pump 51 is provided between the circulation oil path 45 and the lubricating oil path 22e connected to a downstream side of the lubricating oil reservoir 22d to circulate the lubricating oil forcibly. Increase in size of the overall in-wheel motor drive device 21 can be prevented by arranging the rotary pump 51 inside the casing 22.

Figure 4:
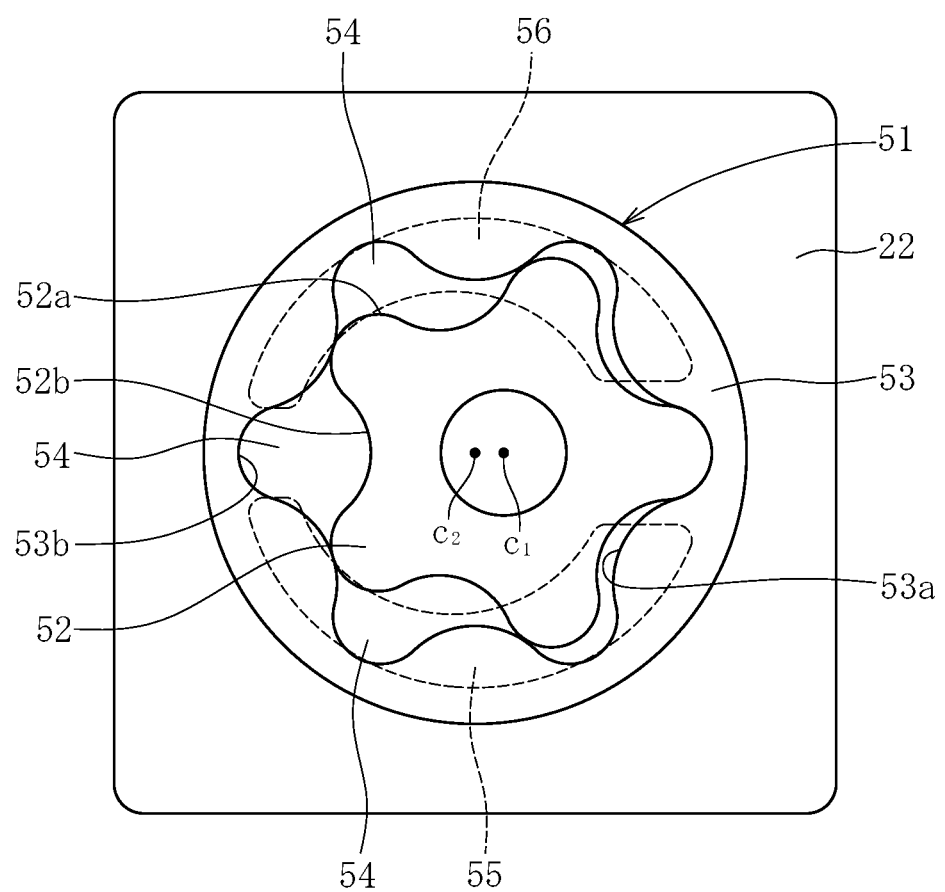
FIG. 4 is a transverse sectional view for illustrating a rotary pump of FIG. 1.

As illustrated in FIG. 4, the rotary pump 51 is a cycloid pump comprising an inner rotor 52 configured to rotate using the rotation of the output shaft 28 of the speed reducer, an outer rotor 53 configured to be driven to rotate along with the rotation of the inner rotor 52, a plurality of pump chambers 54 provided in a space between both the rotors 52 and 53, a suction port 55 communicating with the lubricating oil path 22e, and a discharge port 56 communicating with the radial oil path 45b of the circulation oil path 45.

The inner rotor 52 rotates about a rotation center $c_1$, whereas the outer rotor 53 rotates about a rotation center $c_2$ different from the rotation center ci of the inner rotor 52. As described above, the inner rotor 52 and the outer rotor 53 rotate about the different rotation centers $c_1$ and $c_2$, and hence the volume of each pump chamber 54 changes continuously. Thus, the lubricating oil entering each pump chamber 54 through the suction port 55 is force-fed through the discharge port 56 to the radial oil path 45b.

The lubrication mechanism mainly has the above-mentioned configuration, and supplies the lubricating oil to the respective portions of the motor part A and the speed reduction part B in the following manner, to thereby lubricate and cool the respective portions of the motor part A and the speed reduction part B.

First, the lubricating oil is supplied to the rotor 23b and the stator 23a of the motor part A mainly in such a manner that a part of the lubricating oil supplied to the lubricating oil path 24a of the rotation shaft 24 of the motor through the circulation oil path 45 of the casing 22 is discharged through the lubricating oil supply port 24b under the effect of centrifugal force generated along with the rotation of the rotation shaft 24 of the motor. That is, the lubricating oil discharged through the lubricating oil supply port 24b is supplied to the rotor 23b, and then supplied to the stator 23a. The rolling bearing 36 configured to support the end of the rotation shaft 24 of the motor on the inboard side is lubricated mainly in such a manner that a part of the lubricating oil flowing through the circulation oil path 45 seeps out through the space between the casing 22 and the rotation shaft 24 of the motor. The rolling bearing 36 configured to support the end of the rotation shaft 24 of the motor on the outboard side is lubricated mainly by the lubricating oil that seeps out through the space between the rotary pump 51 and the casing 22.

Next, the lubricating oil flowing into the lubricating oil path 25c of the input shaft 25 of the speed reducer through the lubricating oil path 24a of the rotation shaft 24 of the motor is discharged to the speed reduction part B through the lubricating oil supply ports 25d, 25e, and 25f under the effect of pressure and centrifugal force generated along with the rotation of the input shaft 25 of the speed reducer. After that, the lubricating oil flows in the following manner.

The lubricating oil discharged from the lubricating oil supply ports 25e and 25f is supplied under the action of centrifugal force to the rolling bearings 37a and 37b configured to support the input shaft 25 of the speed reducer. Then, the lubricating oil flowing out of the lubricating oil supply port 25e is guided to the lubricating oil path 31e inside the stabilizer 31b to reach the lubricating oil path 31f inside the inner pins 31 so that the lubricating oil is supplied from the lubricating oil path 31f to the rolling bearing (needle roller bearing) 31a of the inner pins 31. Then, the lubricating oil moves in the radially outward direction under centrifugal force while lubricating portions of contact between the curved plates 26a and 26b and the inner pins 31, portions of contact between the curved plates 26a and 26b and the outer pins 27, the roller bearings 61 configured to support the outer pins 27, rolling bearings 46 configured to support the output shaft 28 of the speed reducer, and other members.

On the other hand, the lubricating oil discharged from the lubricating oil supply port 25d is supplied to the rolling bearing 41 (see FIG. 2) configured to support the curved plates 26a and 26b. Then, in the same manner as the lubricating oil discharged from the lubricating oil supply ports 25e and 25f, the lubricating oil moves in the radially outward direction under centrifugal force while lubricating portions of the contact between the curved plates 26a and 26b and the inner pins 31, the portions of contact between the curved plates 26a and 26b and the outer pins 27, and other members.

The respective portions inside the speed reduction part B are lubricated by the lubricating oil flow as described above. Further, the lubricating oil having reached the inner wall surface of the casing 22 is discharged from the lubricating oil discharge port 22b to be stored in the lubricating oil reservoir 22d. As described above, the lubricating oil reservoir 22d is formed between the lubricating oil discharge port 22b and the lubricating oil path 22e connected to the rotary pump 51. Therefore, even when a part of the lubricating oil cannot temporarily be discharged by the rotary pump 51 particularly during high-speed rotation or other operations, the lubricating oil can be stored in the lubricating oil reservoir 22d. As a result, heat generation and increase in torque loss at the respective portions of the speed reduction part B can be prevented. The amount of lubricating oil having reached the lubricating oil discharge port 22b is reduced particularly during low-speed rotation or other operations. Even in this case, the lubricating oil stored in the lubricating oil reservoir 22d can be returned to the lubricating oil paths 24a and 25c. Thus, the lubricating oil can stably be supplied to the motor part A and the speed reduction part B.

The lubricating oil inside the speed reduction part B moves downward under the gravity in addition to the centrifugal force. Therefore, in the in-wheel motor drive device 21, the lubricating oil reservoir 22d is desirably mounted to the electric vehicle 11 so as to be located below the in-wheel motor drive device 21.

The overall structure of the in-wheel motor drive device 21 is as described above. The in-wheel motor drive device 21 of this embodiment has the following characteristic configuration.

First, in the motor part A, the rolling bearings (deep groove ball bearings) 36 and 36 configured to rotatably support the rotation shaft 24 of the motor on the casing 22 are each mounted into the casing 22 of the motor part A under the condition that a radial internal clearance δ (see FIG. 5) before the rolling bearing 36 is mounted is set to from 8 μm to 25 μm. When the radial internal clearance δ before the rolling bearing 36 is mounted is thus 8 μm or more, the operating clearance of the rolling bearing 36 does not become a negative clearance but constantly becomes a positive clearance even in consideration of the amount of temperature increase during operation. When the radial internal clearance δ before the rolling bearing 36 is mounted is 25 μm or less, the operating clearance is prevented from becoming excessively larger. Thus, when the above-mentioned configuration is employed, the operating clearance of each of the rolling bearings 36 and 36 can be maintained at an appropriate value within a range of positive clearance, thereby being capable of effectively suppressing generation of a rotational first-order forced vibration component along with whirling of the rotation shaft 24 of the motor having the rotor 23b mounted thereto while securing a desired durability life of the rolling bearing 36. Further, the axial movement amount of the rotation shaft 24 of the motor can be reduced, thereby being capable of preventing occurrence of abnormal noises and vibrations along with the axial movement of the rotation shaft 24 of the motor to the extent possible.

Figure 5:
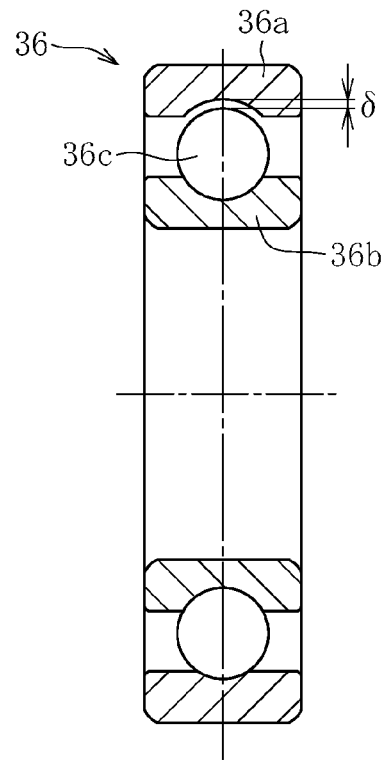
FIG. 5 is a schematic sectional view for illustrating a rolling bearing configured to support a rotation shaft of a motor.

Now, the radial internal clearance δ before the rolling bearing 36 is mounted is described in detail. As illustrated in FIG. 5, the radial internal clearance δ means a radial movement amount of one of the outer ring 36a and the inner ring 36b under a state in which the other is fixed before the rolling bearing (deep groove ball bearing) 36 is mounted into the rotation shaft 24 of the motor or the casing 22. That is, the radial internal clearance δ means a clearance formed between an inner raceway surface of the inner ring 36b and the balls 36c under a state in which the balls 36c are brought into abutment against an outer raceway surface of the outer ring 36a, or a clearance formed between the outer raceway surface of the outer ring 36a and the balls 36c under a state in which the balls 36c are brought into abutment against the inner raceway surface of the inner ring 36b. FIG. 5 is a schematic illustration of the latter state.

In this embodiment, an axial load (preload) is applied to each of the rolling bearings 36 and 36 in advance. In this case, when an appropriate amount of preload is applied, the operating clearance of the rolling bearing 36 becomes easier to maintain within an appropriate range, thereby being capable of more effectively suppressing the occurrence of vibrations due to the whirling of the motor rotor or other phenomena. Further, the rotation shaft 24 of the motor is connected to the input shaft 25 of the speed reducer by spline fitting so that the torque is transmissible therebetween. Therefore, when the rotation shaft 24 of the motor is vibrated along with the rotation of the rotation shaft 24 of the motor, vibrations may also be caused along with, for example, sliding contact between tooth flanks at the connecting portion (spline fitting portion) between the rotation shaft 24 of the motor and the input shaft 25 of the speed reducer. When the axial preload is applied to each of the rolling bearings 36 and 36, the occurrence of vibrations at the connecting portion between the above-mentioned two shafts 24 and 25 can also be prevented to the extent possible.

Figure 6:
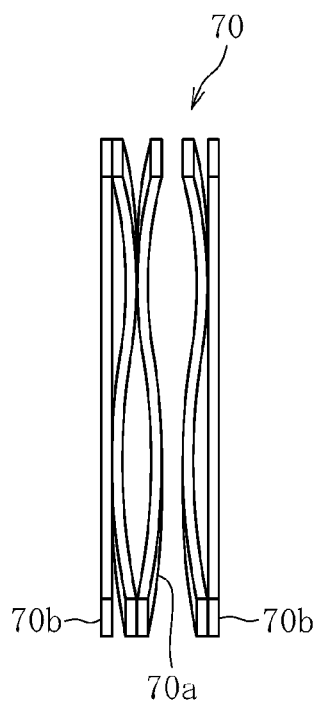
FIG. 6 is a longitudinal sectional view for illustrating a wave spring.

The method of applying the preload is roughly classified into fixed position preload and constant pressure preload. For example, a method involving mechanical positioning belongs to the fixed position preload, whereas a method using an elastic member that is elastically deformable in the axial direction, such as a coil spring, a wave spring, or a flat spring, belongs to the constant pressure preload. When the method involving mechanical positioning is employed in a case of using different materials for the rotation shaft 24 of the motor and the casing 22, the preload amount, that is, the operating clearance of the rolling bearing 36 may significantly fluctuate due to a difference in thermal expansion between the rotation shaft 24 of the motor and the casing 22, and hence the method involving mechanical positioning is not preferred in this case. Therefore, the constant pressure preload, which is not susceptible to fluctuation of axial displacement to be caused by the difference in thermal expansion, is employed in this embodiment. The constant pressure preload may be implemented through use of the elastic members as described above. In this embodiment, a wave spring 70 as illustrated in the enlarged view of FIG. 6 is used. It is preferred that the constant pressure preload have a general preload amount, which is set within a range of from 4d [N] to 10d [N], provided that d represents a shaft diameter of the rotation shaft 24 of the motor, to which the inner ring 36b of the rolling bearing 36 is externally fitted.

FIG. 6 is a longitudinal sectional view for illustrating the wave spring 70. The wave spring 70 is formed by winding a flat spring into a coil, and comprises a spring portion 70a formed at a central portion of the wave spring 70 in the axial direction and curved into a waveform, and flat seating surfaces 70b formed at both ends of the wave spring 70 in the axial direction. As illustrated in FIG. 1, the wave spring 70 is interposed between the casing 22 (center plug 73) and the rolling bearing 36 on the inboard side under a compressed state, to thereby apply the axial preload (constant pressure preload) to each of the rolling bearings 36 and 36.

Now, a method of applying the axial constant pressure preload to the pair of rolling bearings 36 and 36 through use of the wave spring 70 is described with reference to FIG. 1. The constant pressure preload is applied concurrently with completion of assembling of the motor part A, and hence an overview of an assembling procedure of the motor part A is described below. The motor part A is assembled under a state in which the casing 22 of the speed reduction part B and the casing 22 of the motor part A are separated from each other.

First, the stator 23a is fixed to an inner periphery of the casing 22 of the motor part A under a state in which the cover 71 is removed, and then the rolling bearing 36 on the outboard side (left side in FIG. 1) is mounted into the casing 22. Subsequently, the rotation shaft 24 of the motor having the rotor 23b and a rotor 72a of a rotation sensor 72 mounted thereto is inserted along the inner periphery of the casing 22, and the end of the rotation shaft 24 of the motor on the outboard side is fixed to a radially inner portion of the inner ring 36b of the rolling bearing 36 that is mounted into the casing 22 in advance. Subsequently, the cover 71 having the rotation sensor 72 mounted thereto is mounted to the casing 22, and then the rolling bearing 36 on the inboard side is mounted into the space between the radially inner surface of the cover 71 and the radially outer surface of the rotation shaft 24 of the motor.

When the center plug 73 having the wave spring 70 mounted thereto is then fixed to the cover 71, the assembling of the motor part A is completed. At this time, the spring portion 70a of the wave spring 70 is compressively deformed in the axial direction between the outer ring 36a of the rolling bearing 36 and the center plug 73, and hence the outer ring 36a of the rolling bearing 36 on the inboard side is pressed toward the outboard side due to an elastic restoration force of the spring portion 70a. Thus, the axial preload (constant pressure preload) is applied to the pair of rolling bearings 36 and 36 configured to support the rotation shaft 24 of the motor. Therefore, when the wave spring 70 having an appropriate elastic restoration force is selected for use, the operating clearance of each of the rolling bearings 36 and 36 configured to support the rotation shaft 24 of the motor can be maintained and controlled within an appropriate range, thereby being capable of suppressing the whirling of the rotation shaft 24 of the motor.

Considering the easiness of assembling of the motor part A, the assembling procedure involving arranging the wave spring 70 on the inboard side to apply the preload in the final stage of assembling of the motor part A as in this embodiment is preferred from the viewpoint of verifying motion of the rotation shaft 24 of the motor. The reason is as follows. When the wave spring 70 is arranged on the outboard side (left side in FIG. 1), the wave spring 70 is hidden behind the rotor 23b at the time of assembling the motor part A, thereby being difficult to verify whether or not the wave spring 70 is arranged in a predetermined state (whether or not the preload is applied appropriately).

In this embodiment, ceramic balls are employed as the balls 36c constructing the rolling bearing 36. The ceramic ball is lighter than a metal ball, thereby being advantageous in that increase in friction moment (heat generation amount) along with high-speed rotation of the rotation shaft 24 of the motor can be suppressed effectively, and that the rolling bearing 36 and therefore the in-wheel motor drive device 21 are lightened. Further, the employment of the ceramic balls enhances the durability against a failure mode due to a magnetic field, which is a problem in the rolling bearing 36 to be used in electric devices such as the motor part A (in-wheel motor drive device 21).

Further, a resin cage is employed as the cage constructing the rolling bearing 36. Thus, the rolling bearing 36 and therefore the in-wheel motor drive device 21 can further be lightened. When the in-wheel motor drive device 21 is driven, the rotation shaft 24 of the motor is rotated at a high speed of about 15,000 $\text{min}^{-1}$ as described above, and hence the components of the rolling bearing 36 are significantly increased in temperature as well. Therefore, it is preferred that a cage made of a resin material containing a resin excellent in heat resistance as a main component be selected for use as the resin cage constructing the rolling bearing 36. Specifically, a material containing, for example, polyphenylene sulfide (PPS), polyether ether ketone (PEEK), or polyamide (PA) as a main component may be employed preferably. Among the resins exemplified above, polyamide (PA) as typified by polyamide 46 (PA 46) and polyamide 66 (PA 66) not only has cost efficiency but also has relatively high heat resistance. Hence, polyamide (PA) is preferred particularly.

As a matter of course, a metal cage (for example, iron cage) may be employed as the cage of the rolling bearing 36 in place of the resin cage.

Figure 8:
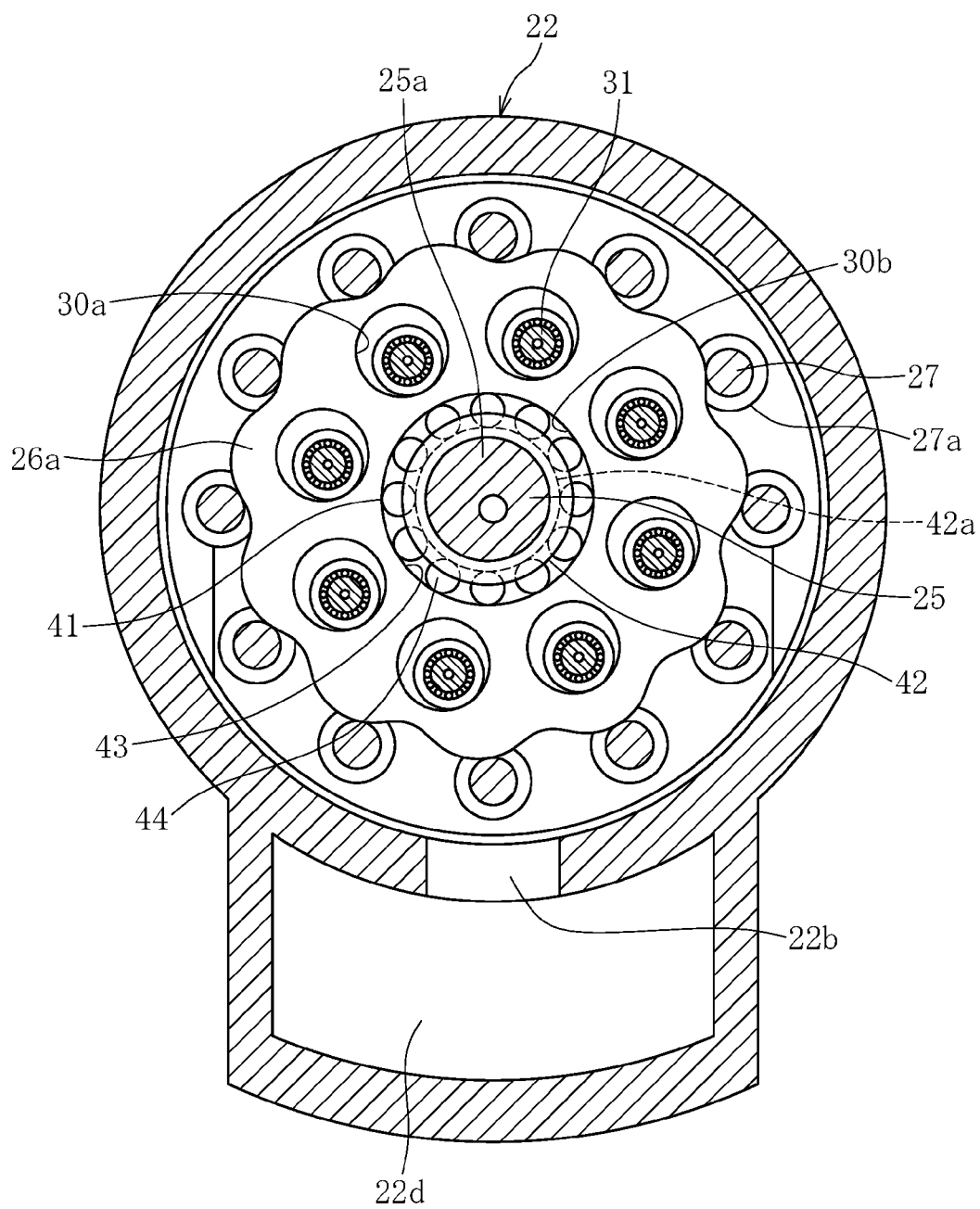
FIG. 8 is a transverse sectional view taken along the line O-O of FIG. 7.
Figure 9:
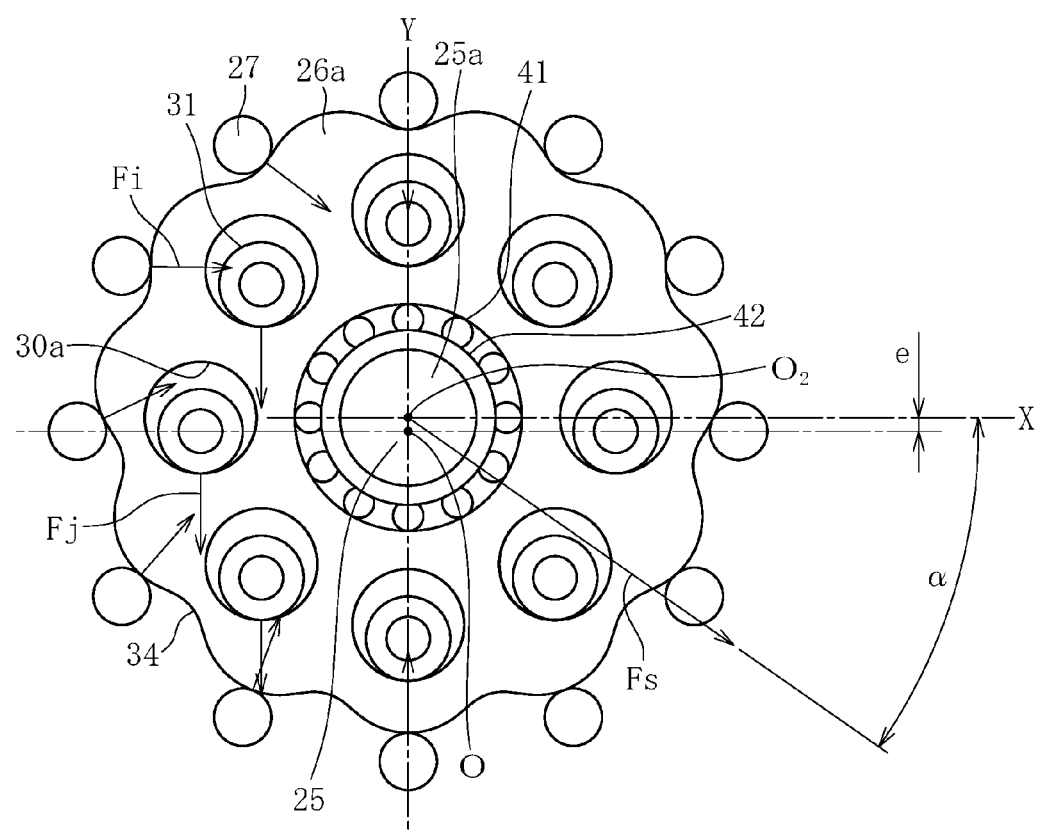
FIG. 9 is an explanatory view for illustrating a load acting on the curved plate of FIG. 7.
Figure 10:
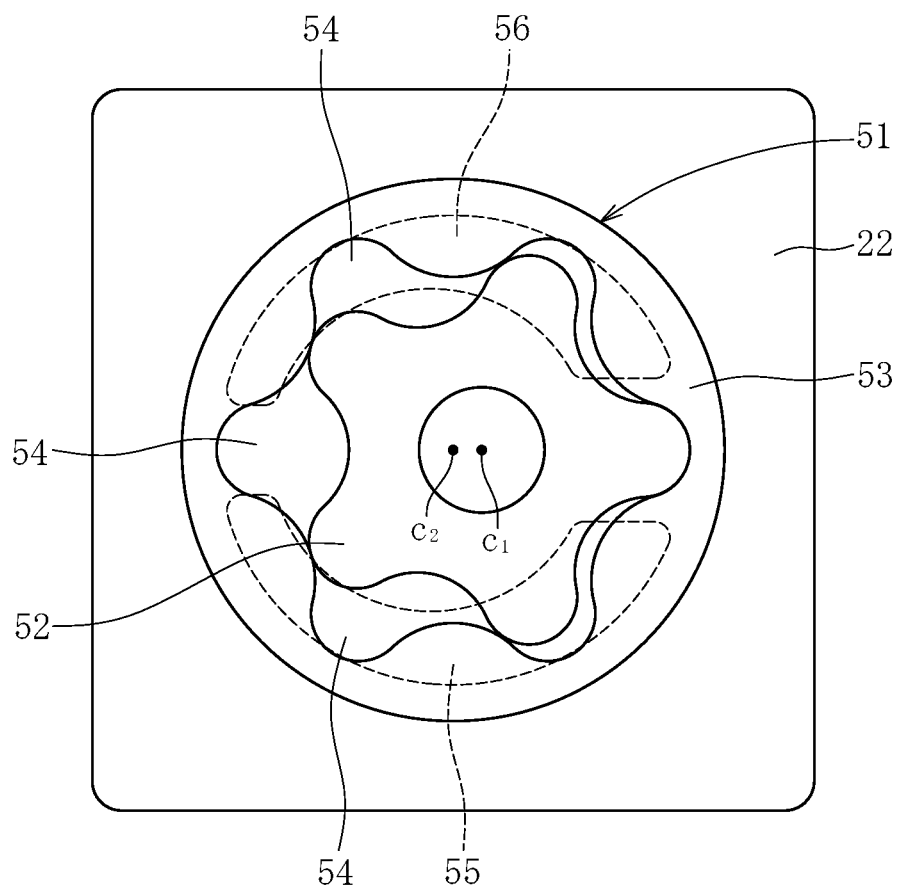
FIG. 10 is a transverse sectional view for illustrating the rotary pump of FIG. 7.
Figure 11A:
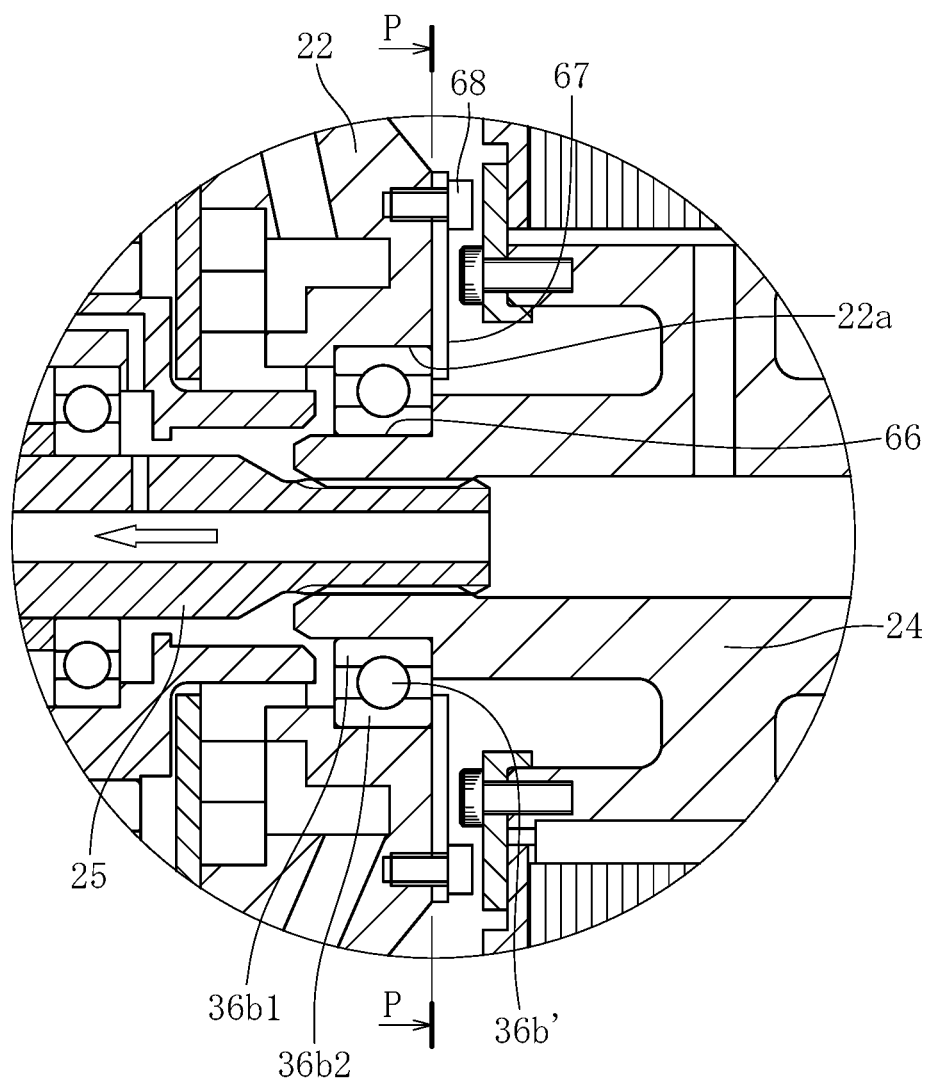
FIG. 11a is a partial longitudinal sectional view for illustrating a part of a rotation shaft of a motor on a speed reduction part side in an enlarged manner.
Figure 11B:
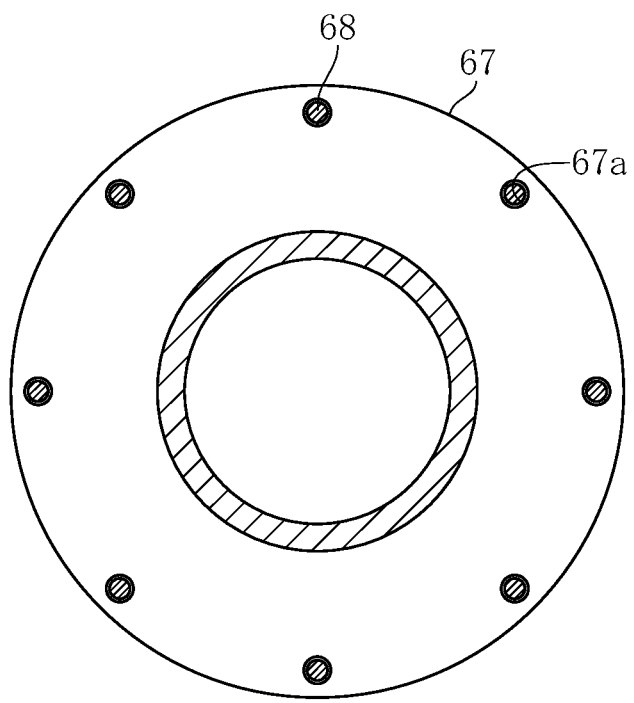
FIG. 11b is a front view for illustrating a holding member, which is taken along the line P-P of FIG. 11a and viewed in the arrow direction.
Figure 12:
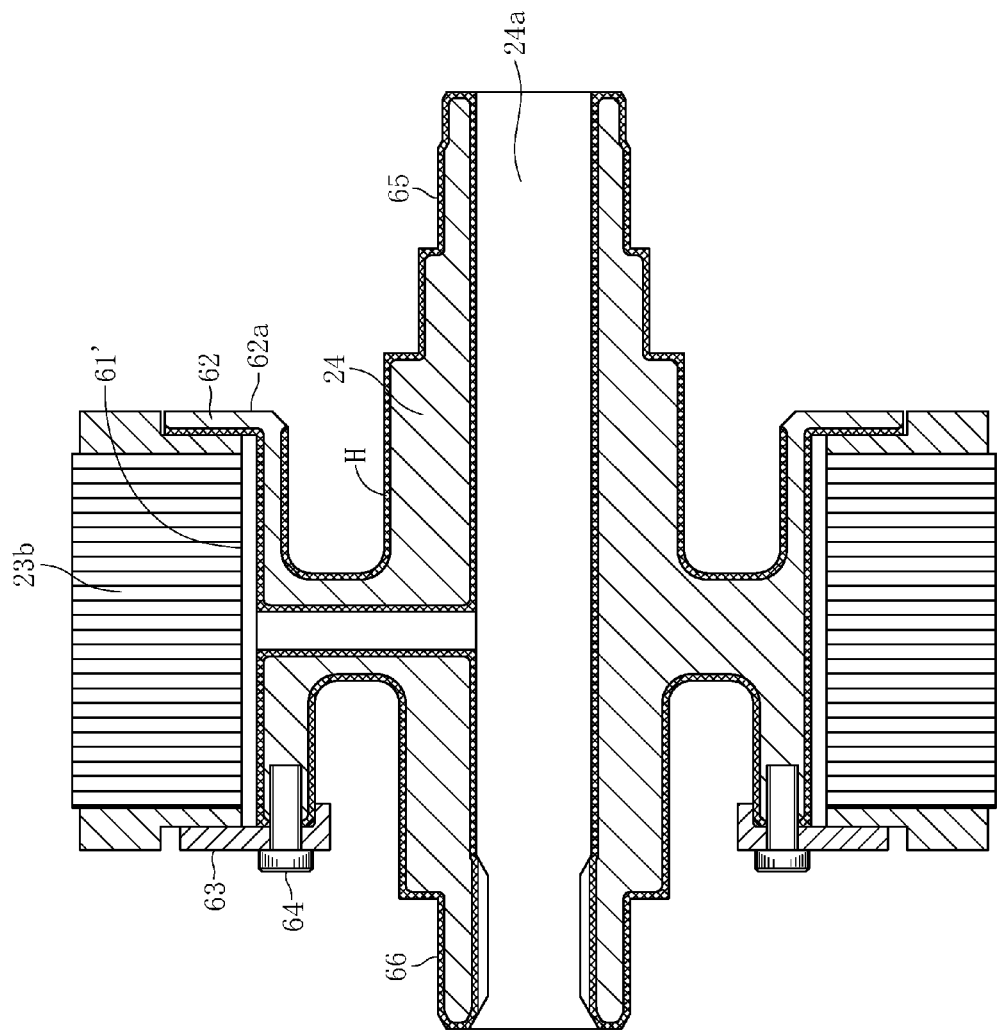
FIG. 12 is a longitudinal sectional view for illustrating the rotation shaft of the motor having a rotor mounted thereto in an enlarged manner.
Figure 13:
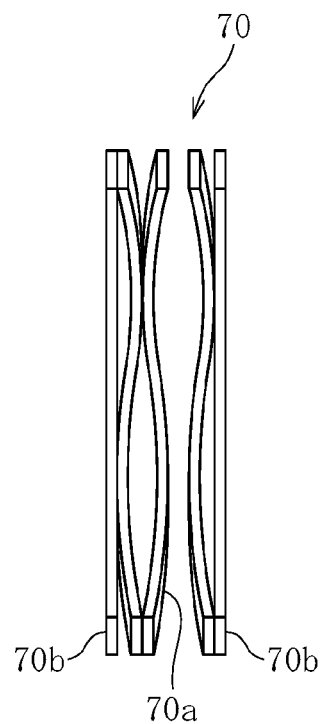
FIG. 13 is a longitudinal sectional view for illustrating a wave spring.

Next, an in-wheel motor drive device 21 according to an embodiment of the second aspect of the present invention is described with reference to FIG. 7 to FIG. 13. FIG. 7 is a schematic longitudinal sectional view for illustrating the in-wheel motor drive device 21. FIG. 8 is a transverse sectional view taken along the line O-O of FIG. 7. FIG. 9 is an explanatory view for illustrating a load acting on the curved plate. FIG. 10 is a transverse sectional view for illustrating the rotary pump. FIG. 11a is a partial longitudinal sectional view for illustrating a part of the rotation shaft of the motor on the speed reduction part side in an enlarged manner. FIG. 11b is a front view for illustrating a holding member, which is taken along the line P-P of FIG. 11a and viewed in the arrow direction. FIG. 12 is a longitudinal sectional view for illustrating the rotation shaft of the motor having the rotor mounted thereto in an enlarged manner. FIG. 13 is a longitudinal sectional view for illustrating the wave spring. Prior to the description of a characteristic configuration of the in-wheel motor drive device according to this embodiment, an overall configuration of the in-wheel motor drive device is described.

As illustrated in FIG. 7, the in-wheel motor drive device 21 comprises the motor part A configured to generate driving force, the speed reduction part B configured to reduce the speed of the rotation of the motor part A to output the rotation, and the wheel bearing part C configured to transmit the output from the speed reduction part B to the rear wheel 14 (see FIG. 17). The motor part A and the speed reduction part B are accommodated in the casing 22 and mounted inside the wheel housing 12a of the electric vehicle 11 as illustrated in FIG. 17. In this embodiment, the casing 22 is constructed such that the motor part A and the speed reduction part B are divisible from each other, and the motor part A and the speed reduction part B are fastened with the bolts. In this description and the claims, the casing 22 refers to both of the casing portion accommodating the motor part A and the casing portion accommodating the speed reduction part B.

The motor part A is the radial gap motor comprising the stator 23a fixed to the casing 22, the rotor 23b arranged inside the stator 23a at the opposed position via the radial gap, and the rotation shaft 24 of the motor, which is connected and fixed to the inside of the rotor 23b so as to rotate integrally with the rotor 23b.

The rotation shaft 24 of the motor having the hollow structure is fitted and fixed to the radially inner surface of the rotor 23b to rotate integrally and is rotatably supported by a rolling bearing 36a' at one end in its axial direction (right side in FIG. 7) and by a rolling bearing 36b' at the other end in the axial direction (left side in FIG. 7) inside the motor part A.

The input shaft 25 of the speed reducer is rotatably supported by the rolling bearing 37a at one approximately central portion in its axial direction (right side in FIG. 7) and by the rolling bearing 37b at the other end in the axial direction (left side in FIG. 7) with respect to the output shaft 28 of the speed reducer. The input shaft 25 of the speed reducer has the eccentric portions 25a and 25b inside the speed reduction part B. The two eccentric portions 25a and 25b are arranged with a 180° phase shift to mutually cancel out centrifugal force caused by eccentric motion.

The rotation shaft 24 of the motor and the input shaft 25 of the speed reducer are connected to each other by spline (including serration; the same applies hereinafter) fitting, and the driving force of the motor part A is transmitted to the speed reduction part B. The spline fitting portion is configured to suppress influences on the rotation shaft 24 of the motor even when the input shaft 25 of the speed reducer inclines to some extent.

The speed reduction part B comprises the curved plates 26a and 26b serving as the revolving members rotatably held at the eccentric portions 25a and 25b, the plurality of outer pins 27 serving as the outer periphery engagement members configured to engage with the outer peripheral portions of the curved plates 26a and 26b, the motion conversion mechanism configured to transmit the rotational motion of the curved plates 26a and 26b to the output shaft 28 of the speed reducer, and the counterweight 29 arranged at the position adjacent to the eccentric portions 25a and 25b.

The output shaft 28 of the speed reducer has the flange portion 28a and the shaft portion 28b. In the flange portion 28a, holes for fixing the inner pins 31 are formed at equal intervals on the circumference about the rotation axis center of the output shaft 28 of the speed reducer. The shaft portion 28b is connected to the hub wheel 32 serving as the inner member in the wheel bearing part C by spline fitting, to thereby transmit the output from the speed reduction part B to the wheel 14. The output shaft 28 of the speed reducer is rotatably supported on the outer pin housing 60 by the rolling bearings 46.

As illustrated in FIG. 8, the curved plate 26a has the plurality of wave patterns formed of trochoidal curves, such as epitrochoidal curves, in the outer periphery portion, and the plurality of through-holes 30a and the through-hole 30b each extending from one end surface to the other end surface. The plurality of through-holes 30a are formed at equal intervals on the circumference about the rotation axis center of the curved plate 26a and are configured to receive the inner pins 31 to be described later. The through-hole 30b is formed at the center of the curved plate 26a, and the eccentric portion 25a is fitted thereinto.

The curved plate 26a is rotatably supported by the rolling bearing 41 with respect to the eccentric portion 25a. As illustrated in FIG. 8, the rolling bearing 41 is the cylindrical roller bearing comprising the inner ring 42 being fitted onto the radially outer surface of the eccentric portion 25a and having the inner raceway surface 42a on the radially outer surface, the outer raceway surface 43 directly formed on the radially inner surface of the through-hole 30b of the curved plate 26a, the plurality of cylindrical rollers 44 arranged between the inner raceway surface 42a and the outer raceway surface 43, and the cage (not shown) configured to retain the cylindrical rollers 44. The inner ring 42 has the flange portion projecting in the radially outward direction from both the ends of the inner raceway surface 42a in the axial direction.

As illustrated in FIG. 8, the outer pins 27 are provided at equal intervals on the circumference about the rotation axis center of the input shaft 25 of the speed reducer. As a result of revolving motion of the curved plates 26a and 26b, the curved wave patterns are engaged with the outer pins 27 to cause rotational motion of the curved plates 26a and 26b. Each outer pin 27 is rotatably supported on the outer pin housing 60 by the needle roller bearing 27a (see FIG. 7). The resistance of contact with the curved plates 26a and 26b can be therefore reduced.

The counterweight 29 (see FIG. 7) has an approximately fan shape, has the through-hole into which the input shaft 25 of the speed reducer is fitted, and is arranged at the position adjacent to each of the eccentric portions 25a and 25b with a 180° phase shift with respect to the eccentric portions 25a and 25b in order to cancel out unbalanced inertia couple caused by the rotation of the curved plates 26a and 26b.

As illustrated in FIG. 7, the motion conversion mechanism comprises the plurality of inner pins 31 held on the output shaft 28 of the speed reducer and the through-holes 30a formed in the curved plates 26a and 26b. The inner pins 31 are provided at equal intervals on the circumference about the rotation axis center of the output shaft 28 of the speed reducer (see FIG. 8), and each have one end in the axial direction fixed to the output shaft 28 of the speed reducer. In order to reduce the resistance of friction against the curved plates 26a and 26b, the needle roller bearing 31a is provided at the position of contact with the inner wall surfaces of the through-holes 30a in the curved plates 26a and 26b.

The stabilizer 31b is provided at the other ends of the inner pins 31 in the axial direction. The stabilizer 31b comprises the annular portion 31c having a circular ring shape and the cylindrical portion 31d extending axially from the radially inner surface of the annular portion 31c. The other ends of the plurality of inner pins 31 in the axial direction are fixed to the annular portion 31c. The load applied to some of the inner pins 31 from the curved plates 26a and 26b is supported by all the inner pins 31 through the stabilizer 31b. Therefore, the stress acting on the inner pins 31 can be reduced to enhance the durability.

The through-holes 30a are formed at the positions corresponding to the plurality of inner pins 31, and the inner diameter dimension of each through-hole 30a is set to be larger by a predetermined dimension than the outer diameter dimension (corresponding to "maximum outer diameter including the needle roller bearing 31a"; the same applies hereinafter) of each inner pin 31.

The state of the load acting on each of the curved plates 26a and 26b is described with reference to FIG. 9. The axis center $O_2$ of the eccentric portion 25a is eccentric with respect to the axis center O of the input shaft 25 of the speed reducer by the amount of the eccentricity e. The curved plate 26a is mounted to the outer periphery of the eccentric portion 25a, and the eccentric portion 25a rotatably supports the curved plate 26a. Accordingly, the axis center $O_2$ is also the axis center of the curved plate 26a. The outer periphery of the curved plate 26a is formed of the wavy curve, and the curved plate 26a has the radially concave and wavy recesses 34 equiangularly. On the periphery of the curved plate 26a, the plurality of outer pins 27 configured to engage with the recesses 34 are arranged in the circumferential direction about the axis center O.

In FIG. 9, when the eccentric portion 25a rotates in the counterclockwise direction on the drawing sheet together with the input shaft 25 of the speed reducer, the eccentric portion 25a revolves about the axis center O. Therefore, the recesses 34 of the curved plate 26a successively come into circumferential contact with the outer pins 27. As a result, as indicated by the arrows, the curved plate 26a is subjected to the load Fi from each of the plurality of outer pins 27 to rotate in the clockwise direction.

The curved plate 26a has the plurality of through-holes 30a formed in the circumferential direction about the axis center $O_2$. The inner pin 31 configured to be joined to the output shaft 28 of the speed reducer, which is arranged coaxially with the axis center O, is inserted through each through-hole 30a. The inner diameter of each through-hole 30a is larger by the predetermined dimension than the outer diameter of each inner pin 31, and hence the inner pins 31 do not impede the revolving motion of the curved plate 26a, and the inner pins 31 utilize the rotational motion of the curved plate 26a to rotate the output shaft 28 of the speed reducer. Then, the output shaft 28 of the speed reducer has a higher torque and a lower number of rotations than the input shaft 25 of the speed reducer, and the curved plate 26a is subjected to the load Fj from each of the plurality of inner pins 31, as indicated by the arrows in FIG. 9. The resultant force Fs of the plurality of loads Fi and Fj is applied to the input shaft 25 of the speed reducer.

The direction of the resultant force Fs varies depending on the geometric conditions such as the wavy shape of the curved plate 26a and the number of the recesses 34, and on the effect of centrifugal force. Specifically, the angle a formed between the resultant force Fs and the reference line X that is orthogonal to the straight line Y connecting the rotation axis center $O_2$ and the axis center O and passes through the axis center $O_2$ varies within the range of from approximately 30° to approximately 60°.

The above-mentioned plurality of loads Fi and Fj vary in load direction and load magnitude during one rotation (360°) of the input shaft 25 of the speed reducer. As a result, the resultant force Fs acting on the input shaft 25 of the speed reducer also varies in load direction and load magnitude. One rotation of the input shaft 25 of the speed reducer causes speed reduction of the wavy recesses 34 of the curved plate 26a to rotate the curved plate 26a by one pitch in the clockwise direction to be brought into the state of FIG. 9. This process is repeated.

As illustrated in FIG. 7, the wheel bearing 33 in the wheel bearing part C is the double-row angular contact ball bearing comprising the inner member having the inner raceway surface 33f directly formed on the radially outer surface of the hub wheel 32 and the inner ring 33a fitted onto the small-diameter step portion of the radially outer surface, the outer ring 33b fitted and fixed to the radially inner surface of the casing 22, the plurality of balls 33c serving as the rolling elements arranged between the inner raceway surface 33f, the inner ring 33a, and the outer ring 33b, the cage 33d configured to keep the interval between the adjacent balls 33c, and the sealing member 33e configured to seal both the ends of the wheel bearing 33 in the axial direction.

Next, the lubrication mechanism is described. The lubrication mechanism is configured to supply the lubricating oil for cooling the motor part A, and also supply the lubricating oil to the speed reduction part B. The lubrication mechanism mainly comprises the lubricating oil paths 24a and 25c, the lubricating oil supply ports 24b, 25d, 25e, and 25f, the lubricating oil discharge port 22b, the lubricating oil reservoir 22d, the lubricating oil path 22e, the rotary pump 51, and the circulation oil path 45 as illustrated in FIG. 7. The outline arrows in the lubrication mechanism indicate directions of lubricating oil flow.

The lubricating oil path 25c, which is connected to the lubricating oil path 24a of the rotation shaft 24 of the motor, extends along the axial direction inside the input shaft 25 of the speed reducer. The lubricating oil supply ports 25d and 25e extend from the lubricating oil path 25c toward the radially outer surface of the input shaft 25 of the speed reducer, and the lubricating oil supply port 25f extends from an axial end of the input shaft 25 of the speed reducer in a rotation axis center direction toward an axial end surface thereof.

The lubricating oil discharge port 22b configured to discharge the lubricating oil inside the speed reduction part B is formed at least at one location of the casing 22 at the position of the speed reduction part B. Further, the lubricating oil reservoir 22d configured to temporarily store the discharged lubricating oil is formed.

As illustrated in FIG. 7, the circulation oil path 45 comprises the axial oil path 45a axially extending inside the casing 22, the radial oil path 45c being connected to one end of the axial oil path 45a in the axial direction (right side in FIG. 7) and extending in the radial direction, and the radial oil path 45b being connected to the other end of the axial oil path 45a in the axial direction (left side in FIG. 7) and extending in the radial direction.

To circulate the lubricating oil forcibly, the rotary pump 51 is provided between the circulation oil path 45 and the lubricating oil path 22e connected to the lubricating oil reservoir 22d. The radial oil path 45b supplies lubricating oil force-fed through the rotary pump 51 to the axial oil path 45a and supplies the lubricating oil from the axial oil path 45a to each of the lubricating oil paths 24a and 25c through the radial oil path 45c.

As illustrated in FIG. 10, the rotary pump 51 is the cycloid pump comprising the inner rotor 52 configured to rotate using the rotation of the output shaft 28 of the speed reducer, the outer rotor 53 configured to be driven to rotate along with the rotation of the inner rotor 52, the pump chambers 54, the suction port 55 communicating with the lubricating oil path 22e, and the discharge port 56 communicating with the radial oil path 45b of the circulation oil path 45. Increase in size of the overall in-wheel motor drive device 21 can be prevented by arranging the rotary pump 51 inside the casing 22.

The inner rotor 52 rotates about the rotation center $c_1$, whereas the outer rotor 53 rotates about the rotation center $c_2$. The inner rotor 52 and the outer rotor 53 rotate about the different rotation centers $c_1$ and $c_2$, and hence the volume of each pump chamber 54 changes continuously. Thus, the lubricating oil entering through the suction port 55 is force-fed through the discharge port 56 to the radial oil path 45b.

The motor part A is cooled as follows. As illustrated in FIG. 7, a part of the lubricating oil returned to the lubricating oil path 24a through the circulation oil path 45 flows through the lubricating oil supply port 24b under centrifugal force to cool the rotor 23b. After that, the lubricating oil splashes to cool the stator 23a.

The speed reduction part B is lubricated as follows. The lubricating oil in the lubricating oil path 25c flows out through the lubricating oil supply ports 25d and 25e to enter the speed reduction part B under centrifugal force and pressure caused along with the rotation of the input shaft 25 of the speed reducer. The lubricating oil flowing out through the lubricating oil supply port 25d lubricates the cylindrical roller bearing 41 (see FIG. 8) supporting each of the curved plates 26a and 26b, and moves in the radially outward direction under centrifugal force while lubricating, for example, the portions of contact between the curved plates 26a and 26b and the inner pins 31, and the portions of contact between the curved plates 26a and 26b and the outer pins 27. The lubricating oil flowing out through the lubricating oil supply ports 25e and 25f is supplied to the deep groove ball bearings 37a and 37b supporting the input shaft 25 of the speed reducer, and further to the internal bearings and the contact portions.

The lubricating oil having reached the inner wall surface of the casing 22 is discharged through the lubricating oil discharge port 22b to be stored in the lubricating oil reservoir 22d. The lubricating oil reservoir 22d is provided between the lubricating oil discharge port 22b and the rotary pump 51. Therefore, even when a part of the lubricating oil cannot temporarily be discharged by the rotary pump 51, the lubricating oil can be stored in the lubricating oil reservoir 22d. As a result, increase in torque loss of the speed reduction part B can be prevented. On the other hand, even when the amount of lubricating oil having reached the lubricating oil discharge port 22b is reduced, the lubricating oil stored in the lubricating oil reservoir 22d can be returned to the lubricating oil paths 24a and 25c by the rotary pump. The lubricating oil moves under the gravity in addition to the centrifugal force. Therefore, the lubricating oil reservoir 22d is desirably mounted to the electric vehicle 11 so as to be located below the in-wheel motor drive device 21.

The overall configuration of the in-wheel motor drive device 21 according to this embodiment is as described above. A characteristic configuration of the in-wheel motor drive device 21 is described below.

As illustrated in FIG. 7, in the motor part A, the stator 23a is fixed to the casing 22, and the rotor 23b is arranged inside the stator 23a at the opposed position via the radial gap. The rotor 23b is fitted and fixed to the outside of the rotation shaft 24 of the motor to rotate integrally with the rotation shaft 24 of the motor.

The rotation shaft 24 of the motor is rotatably supported by the deep groove ball bearing 36a' being the rolling bearing at the one end in the axial direction (right side in FIG. 7) and by the deep groove ball bearing 36b' being the rolling bearing at the other end in the axial direction (left side in FIG. 7) inside the casing 22.

FIG. 12 is a longitudinal sectional view for illustrating the rotation shaft 24 of the motor and the rotor 23b in an enlarged manner. The rotation shaft 24 of the motor is made of case hardening steel such as SCM415 or SCM420, and is subjected to carburizing, quenching, and tempering. A heat-treated hardened layer H is indicated by cross hatching. The surface of the rotation shaft 24 of the motor, which is subjected to carburizing, quenching, and tempering, has a high hardness of from 62 HRC to 66.5 HRC. On the other hand, the central portion has a hardness of from about 29 HRC to about 38 HRC.

A large-diameter radially outer portion 61' of the rotation shaft 24 of the motor is a portion to which the rotor 23b is fitted. A flange portion 62 configured to hold the rotor 23b in the axial direction is formed at one end of the large-diameter radially outer portion 61'. An outer surface 62a of the flange portion 62 is subjected to anti-carburizing treatment, and has a hardness of from about 29 HRC to about 38 HRC. The large-diameter radially outer portion 61' of the rotation shaft 24 of the motor and a radially inner portion of the rotor 23b are fitted to each other by interference fit or shrink fit with an interference selected in consideration of expansion caused by centrifugal force and thermal expansion. In the case of interference fit, the large-diameter radially outer portion 61' of the rotation shaft 24 of the motor and the radially inner portion of the rotor 23b are press-fitted in contact with each other. The large-diameter radially outer portion 61' is formed to have high surface hardness, thereby being capable of preventing abrasion of the contact portion.

After the rotor 23b is press-fitted until the rotor 23b is brought into contact with the flange portion 62 of the large-diameter radially outer portion 61', a separate clamping member 63 is brought into abutment against the other end of the rotor 23b to be fixed by fastening with a bolt 64. In this manner, the rotor 23b is mounted to the rotation shaft 24 of the motor. For the clamping member 63, there is selected a material having high specific gravity, and also having non-magnetic property so that shavings to be generated by cutting work for adjustment of unbalance described later are not attracted to the rotor 23b. As the material for the clamping member 63, austenitic stainless steel is desired.

Referring to FIG. 7, the rotation shaft 24 of the motor is rotated at a high speed of about 15,000 min$^{-1}$ as described above. To suppress the whirling of the rotation shaft 24 of the motor having the rotor 23b mounted thereto, inner rings 36a1 and 36b1 of the deep groove ball bearings 36a' and 36b' and the rotation shaft 24 of the motor are fitted to each other by transition fit or interference fit.

The inner rings 36a1 and 36b1 of the deep groove ball bearings 36a' and 36b' and bearing mounting surfaces 65 and 66 (see FIG. 12) of the rotation shaft 24 of the motor are fitted to each other by transition fit or interference fit, respectively. Due to the heat-treated hardened layers formed on the bearing mounting surfaces 65 and 66, the inner rings 36a1 and 36b1 do not damage the bearing mounting surfaces 65 and 66 at the time of assembling, respectively.

Outer rings 36a2 and 36b2 of the deep groove ball bearings 36a' and 36b' and the casing 22 are fitted to each other by clearance fit. Thus, the rolling elements of the deep groove ball bearings 36a' and 36b' do not damage the raceway surfaces at the time of assembling, thereby being capable of avoiding reduction of the bearing life.

The central portion of the rotation shaft 24 of the motor has toughness, thereby being durable against deformation during high-speed rotation. Therefore, the in-wheel motor drive device is suitable as an in-wheel motor drive device in which a low-torque high-rotation motor and a cycloid reducer capable of obtaining a high speed reduction ratio are used in combination.

After the assembling of the rotor 23b onto the rotation shaft 24 of the motor is completed, the adjustment of unbalance is carried out for the purpose of reducing a rotational first-order forced vibration component. The outer surface 62a of the flange portion 62 of the large-diameter radially outer portion 61' and the outer surface of the clamping member 63 are surfaces for correction of balance. The outer surface 62a of the flange portion 62 and the outer surface of the clamping member 63 are set as the surfaces for correction of balance because the surfaces are preferably formed as nearly on the radially outer side as possible in order to reduce the cutting amount for the adjustment of unbalance. The present invention is not limited thereto, and any one of the outer surface 62a of the flange portion 62 and the outer surface of the clamping member 63 may be set as the surface for correction of balance. The outer surface 62a of the flange portion 62 is subjected to anti-carburizing treatment to have low hardness, thereby being capable of achieving satisfactory cutting work for the adjustment of unbalance, reducing the cycle time of the cutting step, facilitating the adjustment of unbalance, and reducing the cost. The clamping member 63 has high specific gravity, thereby being capable of reducing the processing amount, reducing the cycle time of the cutting step, facilitating the adjustment of unbalance, and reducing the cost.

The anti-carburizing treatment for the flange portion 62 may be implemented by any appropriate methods such as a method that involves applying an anti-carburizing agent onto the outer surface 62a and a method that involves carburizing while bringing a jig into surface contact with the outer surface 62a. The carburizing and quenching are flexible in response to minor changes to the shape and also simple to discriminate the heat treatment portion and the non-heat treatment portion of the rotation shaft 24 of the motor, thereby being advantageous in terms of cost.

To suppress the whirling of the rotation shaft 24 of the motor due to the clearance fit between the outer rings 36a2 and 36b2 of the deep groove ball bearings 36a' and 36b' and the casing 22, this embodiment provides the configuration illustrated in FIG. 11a and FIG. 11b. FIG. 11a is a longitudinal sectional view for illustrating, in an enlarged manner, a peripheral portion of the spline fitting portion between the rotation shaft 24 of the motor and the input shaft 25 of the speed reducer and the deep groove ball bearing 36b' configured to support the rotation shaft 24 of the moter in FIG. 7. FIG. 11b is a front view for illustrating the holding member, which is taken along the line P-P of FIG. 11a and viewed in the arrow direction.

Referring to FIG. 11a, the rotation shaft 24 of the motor is rotatably supported on the casing 22 by the deep groove ball bearing 36b'. The inner ring 36b1 of the deep groove ball bearing 36b' and the bearing mounting surface 66 of the rotation shaft 24 of the motor are fitted to each other by transition fit or interference fit, whereas the outer ring 36b2 and a bearing mounting surface 22a of the casing 22 are fitted to each other by clearance fit. The end surface of the outer ring 36b2 is pressed by a holding member 67. As illustrated in FIG. 11b, the holding member 67 is a hollow disc, and has through-holes 67a formed on a radially outer side thereof for insertion of a plurality of bolts 68. The hatched portion of the holding member 67 on a radially inner side thereof is an abutment portion against the end surface of the outer ring 36b2. After the deep groove ball bearing 36b' is mounted onto the bearing mounting surface 22a of the casing 22, the holding member 67 is fastened to the casing 22 with the bolts 68. The hatched portion of the side surface of the holding member 67 presses the end surface of the outer ring 36b2 to fix the deep groove ball bearing 36b'.

The rotation shaft 24 of the motor is connected to the input shaft 25 of the speed reducer by spline fitting. The spline fitting portion is affected by the operation of the speed reduction part B. The outer pin housing 60 configured to hold the outer pins 27 of the speed reduction part B as illustrated in FIG. 7 is supported on the casing 22 in a floating state by a rotation stopper (not shown) having an elastic support function. With this configuration, significant radial and moment loads, which may be generated due to, for example, turning or abrupt acceleration and deceleration of the vehicle, are absorbed to prevent damage to various components such as the curved plates 26a and 26b, the outer pins 27, and the motion conversion mechanism configured to convert eccentric pivot motion of each of the curved plates 26a and 26b into rotary motion of the output shaft 28 of the speed reducer.

Under the state of the above-mentioned floating structure, the radial and moment loads, which vary in load direction and load magnitude, are applied to the input shaft 25 of the speed reducer from each of the curved plates 26a and 26b as described above. Therefore, the torque is transmitted at the spline fitting portion between the rotation shaft 24 of the motor and the input shaft 25 of the speed reducer under a state in which inclination or axial misalignment is caused to some extent. The outer ring 36b2 of the deep groove ball bearing 36b' and the casing 22 are fitted to each other by clearance fit as described above, but the end surface of the outer ring 36b2 is pressed by the holding member 67, thereby being capable of suppressing misalignment to be caused between the rotation shaft 24 of the motor and the input shaft 25 of the speed reducer and motion such as vibrations to be caused by rattling of the meshing at the spline fitting portion. Due to such an operation state, it is effective that the deep groove ball bearing 36b' on the side where the rotation shaft 24 of the motor is spline-fitted to the input shaft 25 of the speed reducer (end on the speed reduction part side) is set as a bearing to be held by the holding member 67 at the end surface of the outer ring of the bearing.

It is preferred that a plate member be used for the holding member 67 as a member capable of obtaining easiness of assembling and appropriate pressing force. The plate member is capable of easily varying the pressing force by changing the thickness, and is also easily adaptable to variation of the shape of the pressing portion. It is preferred that the thickness be from 0.5 mm to 5 mm. The thickness of less than 0.5 mm is inappropriate because the pressing force is so small that the bearing holding force becomes smaller. The thickness of more than 5 mm is not preferred because reduction in axial length, which is a structural requirement for the in-wheel motor drive device, cannot be achieved.

Further, a bearing internal clearance of each of the deep groove ball bearings 36a' and 36b' configured to support the rotation shaft 24 of the motor is a factor in the whirling of the rotation shaft 24 of the motor. Therefore, a load (preload) is applied to each of the deep groove ball bearings 36a' and 36b' in advance in this embodiment, to thereby eliminate the bearing internal clearance in use.

The method of applying the preload is classified into fixed position preload and constant pressure preload. For example, a method involving mechanical positioning belongs to the fixed position preload, whereas a method using a spring element belongs to the constant pressure preload. When different materials are used for the rotation shaft 24 of the motor and the casing 22, the method involving mechanical positioning may lead to fluctuation of the preload due to a difference in thermal expansion. Therefore, the constant pressure preload, which is not susceptible to fluctuation of axial displacement to be caused by the difference in thermal expansion, is preferred. It is preferred that the constant pressure preload of this embodiment have a general preload amount, which is set within a range of from 4d [N] to 10d [N], provided that d represents a shaft diameter of the rotation shaft 24 of the motor, to which the inner rings 36a1 and 36b1 of the deep groove ball bearings 36a' and 36b' are fitted. As a member for achieving the constant pressure preload, the wave spring 70 is used as illustrated in FIG. 13.

FIG. 13 is a longitudinal sectional view for illustrating the wave spring 70. The wave spring 70 is formed by winding a flat spring into a coil, and comprises the spring portion 70a formed at a central portion of the wave spring 70 in the axial direction and curved into a waveform, and the flat seating surfaces 70b formed at both ends of the wave spring 70. The wave spring 70 is compressed to apply the preload to the bearing.

A method of applying the constant pressure preload to each of the deep groove ball bearings 36a' and 36b' through use of the wave spring 70 is described with reference to FIG. 7. As an overview of assembling of the motor part A, the rotation shaft 24 of the motor and the deep groove ball bearings 36a' and 36b' configured to support the rotation shaft 24 of the motor are assembled under a state in which the stator 23a is mounted and fixed to the inner periphery of the casing 22 of the motor part A from which the rear cover 71 is removed. At the time of assembling, the casing 22 of the speed reduction part B is separated from the casing 22 of the motor part A. First, the deep groove ball bearing 36b' on the speed reducer side is mounted onto the bearing mounting surface 22a of the casing 22 (see FIG. 11a), and the holding member 67 is fastened to the casing 22 with the bolts 68, to thereby hold the end surface of the outer ring 36b2 of the deep groove ball bearing 36b'. Next, the rotation shaft 24 of the motor having the rotor 23b and the rotor 72a of the rotation sensor 72 mounted thereto is inserted toward the other side in the axial direction (left side in FIG. 7), and is press-fitted to a radially inner portion of the inner ring 36b1 of the deep groove ball bearing 36b'.

After that, the rotation shaft 24 of the motor is fitted along a bearing mounting surface 71a of the rear cover 71 having the rotation sensor 72 mounted thereto, and the rear cover 71 is mounted into one end of the casing 22 in the axial direction (right side in FIG. 7). Then, the deep groove ball bearing 36a' is inserted into the space between the bearing mounting surface 71a of the rear cover 71 and the bearing mounting surface 65 of the rotation shaft 24 of the motor. At this time, the bearing mounting surface 65 of the rotation shaft 24 of the motor and the inner ring 36a1 of the deep groove ball bearing 36a' are fitted to each other by transition fit or interference fit, and hence press fitting is carried out therebetween.

After that, the center plug 73 having the wave spring 70 mounted thereto is fitted and fixed into the rear cover 71. The wave spring 70 is compressed to generate spring force, which presses the end surface of the outer ring 36a2 of the deep groove ball bearing 36a' toward the other side in the axial direction (left side in FIG. 7). As a result, the preload (constant pressure preload) is applied to the pair of deep groove ball bearings 36a' and 36b'. Thus, the bearing internal clearance of each of the deep groove ball bearings 36a' and 36b' configured to support the rotation shaft 24 of the motor can be eliminated, thereby being capable of suppressing the whirling of the rotation shaft 24 of the motor. Further, the constant pressure preload is applied through use of the wave spring 70, thereby being capable of suppressing the fluctuation of the preload due to the difference in thermal expansion of the casing 22, the rotation shaft 24 of the motor, and other components.

Considering the easiness of assembling of the motor, the assembling procedure involving arranging the preload spring (wave spring 70) on one side in the axial direction (right side in FIG. 7) to apply the preload in the final stage of assembling as in this embodiment is preferred from the viewpoint of verifying the motion of the rotation shaft 24 of the motor. Conversely, when the preload spring is arranged on the bearing 36b' on the other side in the axial direction (left side in FIG. 7), the preload spring is hidden behind the rotor 23b at the time of assembling, thereby being difficult to verify whether or not the preload is applied properly. Hence, this arrangement is not preferred in this case.

Figure 14:
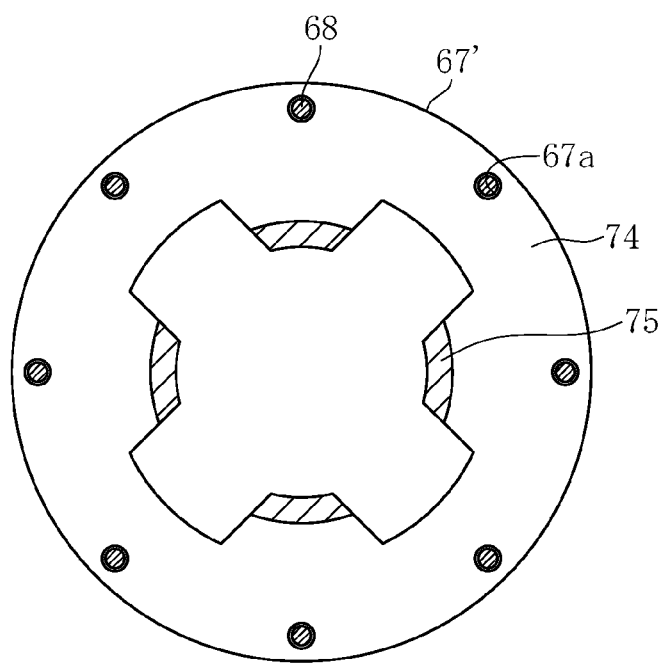
FIG. 14 is a front view for illustrating a modified example of the holding member.
Figure 15:
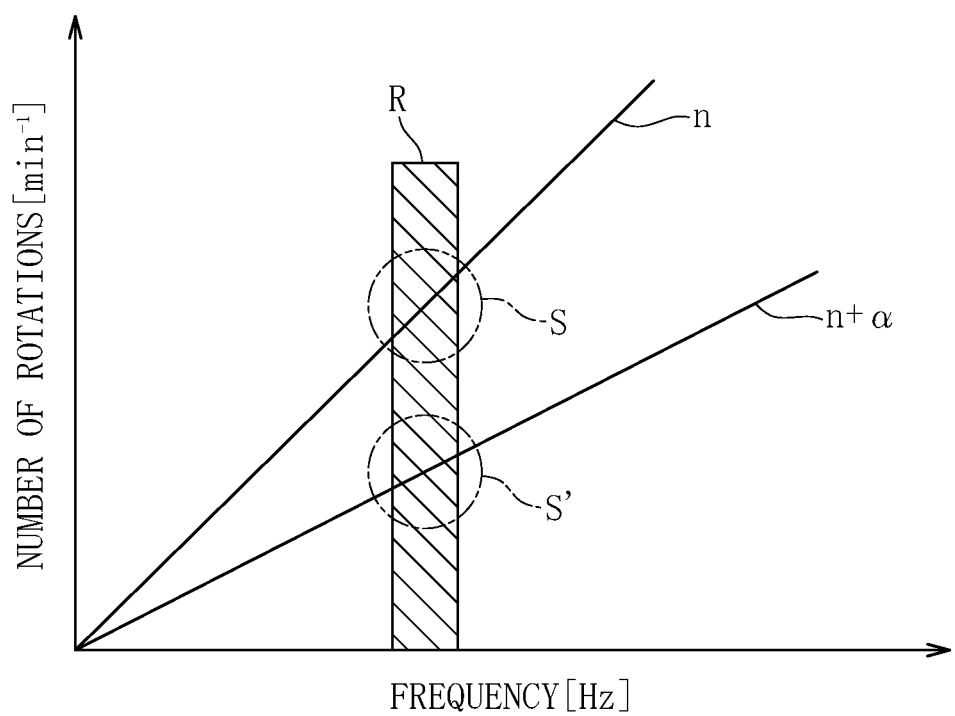
FIG. 15 is an explanatory graph for showing a relationship between a resonance frequency and each forced vibration component.

A modified example of the holding member is illustrated in FIG. 14. A holding member 67' of this modified example comprises a base portion 74, which is a hollow disc, and a plurality of projecting portions 75, which project in the radially inward direction from the base portion 74. The hatched portions of the projecting portions 75 on a radially inner side thereof are abutment portions against the end surface of the outer ring 36b2. In the holding member 67' of this modified example, the plurality of projecting portions 75 apply the pressing force individually, and hence the adaptability to the end surface of the outer ring 36b2 is excellent so that stable pressing force is applied.

The above-mentioned in-wheel motor drive device 21 according to this embodiment is capable of reducing the rotational first-order forced vibration component to such a level that a low-torque high-rotation motor may be employed, reduced in size and weight, excellent in quietness, and is enhanced in durability.

The overall operation principle of the in-wheel motor drive device 21 having the above-mentioned configuration according to each of the embodiment of the first aspect of the present invention and the embodiment of the second aspect of the present invention is described with reference to FIG. 1, FIG. 2, FIG. 7, and FIG. 8.

In the motor section A, for example, coils in the stator 23a are supplied with AC current to generate an electromagnetic force, which in turn rotates the rotor 23b formed of a permanent magnet or a magnetic member. Along with this, the input shaft 25 of the speed reducer, which is connected to the rotation shaft 24 of the motor, is rotated to cause the curved plates 26a and 26b to revolve about the rotation axis center of the input shaft 25 of the speed reducer. Then, the outer pins 27 come into engagement with the curved wave patterns formed on the outer peripheral portions of the curved plates 26a and 26b to rotate the curved plates 26a and 26b on their axes in an opposite direction to the rotation of the input shaft 25 of the speed reducer.

The inner pins 31 inserted through the through-holes 30a come into contact with the inner wall surfaces of the through-holes 30a along with the rotational motion of the curved plates 26a and 26b. The revolving motion of the curved plates 26a and 26b is therefore not transmitted to the inner pins 31, and only the rotational motion of the curved plates 26a and 26b is transmitted to the wheel bearing part C through the output shaft 28 of the speed reducer. In this process, the speed of the rotation of the input shaft 25 of the speed reducer is reduced by the speed reduction part B and the rotation is transmitted to the output shaft 28 of the speed reducer. Therefore, a necessary torque can be transmitted to the driving wheel (rear wheel) 14 even in a case where the motor part A of a low-torque high-rotation type is employed.

When the number of the outer pins 27 and the number of wave patterns formed on the outer peripheral portions of the curved plates 26a and 26b are denoted by $Z_A$ and $Z_B$, respectively, the speed reduction ratio in the speed reduction part B having the above-mentioned configuration is calculated by $(Z_A-Z_B)/Z_B$. In the embodiments illustrated in FIG. 2 and FIG. 8, $Z_A=12$ and $Z_B=11$. Thus, a very high speed reduction ratio of 1/11 can be obtained.

The in-wheel motor drive device 21 that is compact and has a high speed reduction ratio can be obtained by using the speed reduction part B capable of obtaining a high speed reduction ratio without requiring a multi-stage configuration. Moreover, the rolling bearings (needle roller bearings) 27a, 61, and 31a are provided to the outer pins 27 and the inner pins 31, respectively, to reduce the resistance of friction between the curved plates 26a and 26b and the outer pins 27 and the inner pins 31, thereby enhancing the transmission efficiency of the speed reduction part B.

With the above-mentioned configuration, it is possible to achieve the in-wheel motor drive device 21 that is excellent in quietness (NVH characteristics) and durability while being lightweight and compact. Therefore, the unsprung weight can be reduced when the in-wheel motor drive device 21 according to this embodiment is mounted on the electric vehicle 11. As a result, the electric vehicle 11 having excellent driving stability and NVH characteristics can be achieved.

The in-wheel motor drive device 21 according to each of the embodiment of the first aspect of the present invention and the embodiment of the second aspect of the present invention is described above, but various modifications may be made to the in-wheel motor drive device 21 without departing from the gist of the present invention.

For example, in the embodiment described above, there has been given an example in which the lubricating oil supply port 24b is formed in the rotation shaft 24 of the motor, the lubricating oil supply port 25e is formed in the vicinity of the rolling bearing 37a, the lubricating oil supply port 25d is formed in each of the eccentric portions 25a and 25b, and the lubricating oil supply port 25f is formed in the axial end of the input shaft 25 of the speed reducer. The present invention is not limited thereto, and the lubricating oil supply ports may be formed at arbitrary positions in the rotation shaft 24 of the motor and the input shaft 25 of the speed reducer.

In the above, there has been given an example in which the cycloid pump is employed as the rotary pump 51, but the present invention is not limited thereto. Any rotary pump that is driven using the rotation of the output shaft 28 of the speed reducer may be employed. Further, the rotary pump 51 may be omitted so that the lubricating oil is circulated only by centrifugal force.

There has been given an example in which the two curved plates 26a and 26b of the speed reduction part B are arranged with a 180° phase shift. However, the number of curved plates may be arbitrarily set and in a case where three curved plates are arranged, for example, the three curved plates may be arranged with a 120° phase shift.

In the above, the motion conversion mechanism comprises the inner pins 31 fixed to the output shaft 28 of the speed reducer and the through-holes 30a formed in the curved plates 26a and 26b. However, an arbitrary configuration may be applied to the motion conversion mechanism as long as the rotation of the speed reduction part B can be transmitted to the hub wheel 32. For example, the motion conversion mechanism may comprise inner pins fixed to the curved plates and holes formed in the output shaft of the speed reducer.

Attention has been focused on the rotation of each member to describe the operation in the embodiments. In fact, however, power containing a torque is transmitted from the motor part A to the rear wheel 14. Accordingly, the power after speed reduction as described above is converted into a high torque.

There has been given a case where electric power is supplied to the motor part A to drive the motor part and the power from the motor part A is transmitted to the rear wheel 14. Contrary to this, however, when a vehicle decelerates or travels down a slope, power from the driving wheel 14 side may be converted at the speed reduction part B into high-rotation low-torque rotation so that the rotation is transmitted to the motor part A for electric power generation in the motor part A. Further, the electric power generated in the motor part A may be stored in a battery so that the electric power may be utilized as electric power for driving the motor part A or electric power for operating other electric devices provided in the vehicle.

A brake may also be added to the in-wheel motor drive device 21. For example, in the configuration of FIG. 1 and FIG. 7, the casing 22 may be extended in its axial direction to form a space on the inner side of the rotor 23b in a vehicle width direction, and a rotary member configured to rotate integrally with the rotor 23b, a piston non-rotatable with respect to the casing 22 and movable in its axial direction, and a cylinder configured to operate the piston may be arranged in the space, thereby being capable of constructing a parking brake in which the rotor 23b is locked by the piston and the rotary member while the vehicle is stopped. The brake may also be a disc brake in which a flange formed at a part of the above-mentioned rotary member and a friction plate arranged on the casing 22 side are sandwiched using a cylinder arranged on the casing 22 side. The brake may also be a drum brake in which a drum is formed at a part of the above-mentioned rotary member and a brake shoe is fixed on the casing 22 side so that the rotary member is locked by the actions of frictional engagement and self-engagement.

In the above, there has been applied a configuration in which a radial gap motor is employed in the motor part A. However, the present invention is also suitably applicable to a case where an axial gap motor comprising a stator and a rotor opposed to each other via an axial gap is employed in the motor part A.

The in-wheel motor drive device according to the present invention is applicable not only to the rear-wheel-drive electric vehicle 11, in which the rear wheels 14 are used as driving wheels, but also to a front-wheel-drive electric vehicle, in which the front wheels 13 are used as driving wheels, or to a four-wheel-drive electric vehicle, in which the front wheels 13 and the rear wheels 14 are used as driving wheels. Note that, "electric vehicle" as used herein is a concept encompassing all vehicles that may obtain driving force from electric power and also encompasses, for example, a hybrid car.

The present invention is not limited to the above-mentioned embodiments. As a matter of course, the present invention may be carried out in various modes without departing from the gist of the present invention. The scope of the present invention is defined in claims, and encompasses equivalents described in claims and all changes within the scope of claims.

DESCRIPTION OF REFERENCE SIGNS 11 electric vehicle, 12 chassis, 12a wheel housing, 12b suspension device, 13 front wheel, 14 rear wheel, 21 in-wheel motor drive device, 22 casing, 22a bearing mounting surface, 22b lubricating oil discharge port, 22d lubricating oil reservoir, 22e lubricating oil path, 23a stator, 23b rotor, 24 rotation shaft of motor, 25 input shaft of speed reducer, 25a eccentric portion, 25b eccentric portion, 25c lubricating oil path, 25d lubricating oil supply port, 25e lubricating oil supply port, 26a curved plate, 26b curved plate, 27 outer pin, 27a needle roller bearing, 28 output shaft of speed reducer, 29 counterweight, 30b through-hole, 31 inner pin, 31a needle roller bearing, 31b stabilizer, 31c annular portion, 31d cylindrical portion, 32 hub wheel, 33 wheel bearing, 33a inner ring, 33b outer ring, 33c ball, 33d cage, 33e sealing member, 33f inner raceway surface, 36a outer ring, 36a' rolling bearing, 36b inner ring, 36b' rolling bearing, 36c ball (rolling element), 37a rolling bearing, 37b rolling bearing, 41 rolling bearing, 42 inner ring, 43 outer raceway surface, 44 cylindrical roller, 45 circulation oil path, 45a axial oil path, 45b radial oil path, 45c radial oil path, 46 rolling bearing, 51 rotary pump, 52 inner rotor, 53 outer rotor, 54 pump chamber, 55 suction port, 56 discharge port, 60 outer pin housing, 61 rolling bearing, 61' large-diameter radially outer portion, 62 flange portion, 62a outer surface, 63 clamping member, 65 bearing mounting surface, 66 bearing mounting surface, 67 holding member, 67' holding member, 68 bolt, 70 wave spring, A motor part, B speed reduction part, C wheel bearing part, H heat-treated hardened layer, δ radial internal clearance before rolling bearing is mounted.

The invention claimed is:

1. An in-wheel motor drive device comprising:
   a motor part;
   a speed reduction part;
   a wheel bearing part; and
   a casing configured to hold the motor part, the speed reduction part and the wheel bearing part, wherein
   the motor part comprises:
   a stator, which is fixed to the casing;
   a rotation shaft of a motor, which is rotatably supported on the casing through intermediation of rolling bearings; and
   a rotor, which is mounted to the rotation shaft of the motor, the speed reduction part comprises:
   an input shaft of a speed reducer, which is rotationally driven by the rotation shaft of the motor; and
   an output shaft of the speed reducer, which is configured to transmit rotation of the input shaft of the speed reducer, which is reduced in speed, to the wheel bearing part,
   each of the rolling bearings has a radial internal clearance of from 8 μm to 25 μm before being mounted, and
   each of the rolling bearings has an axial constant pressure preload applied thereto.

2. The in-wheel motor drive device according to claim 1, wherein the axial constant pressure preload is applied by an elastic member, which is elastically deformable in an axial direction thereof.

3. The in-wheel motor drive device according to claim 1, wherein each of the rolling bearings comprises ceramic balls as rolling elements.

4. The in-wheel motor drive device according to claim 1, wherein each of the rolling bearings comprises a resin cage.

5. The in-wheel motor drive device according to claim 1, further comprising a lubrication mechanism configured to supply lubricating oil to the motor part.

6. The in-wheel motor drive device according to claim 1, wherein the speed reduction part further comprises:
   a revolving member, which is rotatably held at an eccentric portion of the input shaft of the speed reducer, and is configured to perform revolving motion about a rotation axis center of the input shaft of the speed reducer along with the rotation of the input shaft of the speed reducer;
   an outer periphery engagement member, which is engaged with an outer peripheral portion of the revolving member to cause rotational motion of the revolving member; and
   a motion conversion mechanism, which is configured to convert the rotational motion of the revolving member into rotary motion about the rotation axis center of the input shaft of the speed reducer to transmit the rotary motion to the output shaft of the speed reducer.

7. An in-wheel motor drive device comprising:
a motor part;
a speed reduction part;
a wheel bearing part; and
a casing, wherein
the motor part comprises:
  a stator, which is fixed to the casing;
  a rotation shaft of a motor, which is rotatably supported on the casing through intermediation of a plurality of rolling bearings; and
  a rotor, which is mounted to the rotation shaft of the motor,
the rotation shaft of the motor in the motor part is configured to rotationally drive an input shaft of a speed reducer in the speed reduction part,
the speed reduction part is configured to reduce a speed of rotation of the input shaft of the speed reducer to transmit the rotation to an output shaft of the speed reducer,
the wheel bearing part is connected to the output shaft of the speed reducer,
the rotation shaft of the motor and the plurality of rolling bearings configured to support the rotation shaft of the motor are fitted to each other by transition fit or interference fit,
the plurality of rolling bearings and the casing are fitted to each other by clearance fit, and
each of the plurality of rolling bearings has an axial constant pressure preload applied thereto.

8. The in-wheel motor drive device according to claim 7,
wherein the rotation shaft of the motor is supported on both sides thereof through intermediation of a pair of rolling bearings, and
wherein any one of the pair of rolling bearings is fixed by bringing a side surface of a holding member, which is fixed to the casing, into abutment against an end surface of an outer ring of the any one of the pair of rolling bearings.

9. The in-wheel motor drive device according to claim 8, wherein the any one of the pair of rolling bearings, which is fixed by the holding member, corresponds to a bearing configured to support an end of the rotation shaft of the motor on a speed reduction part side.

10. The in-wheel motor drive device according to claim 8, wherein the holding member comprises a hollow disc.

11. The in-wheel motor drive device according to claim 8, wherein the holding member comprises:
a base portion, which is a hollow disc; and
a plurality of abutment portions, which project in a radially inward direction from the base portion.

\* \* \* \* \*